US010286606B2

(12) United States Patent
Duro Royo et al.

(10) Patent No.: US 10,286,606 B2
(45) Date of Patent: May 14, 2019

(54) METHODS AND APPARATUS FOR ADDITIVE MANUFACTURING ALONG USER-SPECIFIED TOOLPATHS

(71) Applicants: Jorge Duro Royo, Cambridge, MA (US); Laia Mogas Soldevila, Cambridge, MA (US); Neri Oxman, Cambridge, MA (US)

(72) Inventors: Jorge Duro Royo, Cambridge, MA (US); Laia Mogas Soldevila, Cambridge, MA (US); Neri Oxman, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 506 days.

(21) Appl. No.: 14/854,937

(22) Filed: Sep. 15, 2015

(65) Prior Publication Data

US 2016/0075089 A1    Mar. 17, 2016

Related U.S. Application Data

(60) Provisional application No. 62/050,724, filed on Sep. 15, 2014.

(51) Int. Cl.
*B29C 64/386* (2017.01)
*B29C 64/106* (2017.01)
(Continued)

(52) U.S. Cl.
CPC .......... *B29C 64/386* (2017.08); *B29C 64/106* (2017.08); *B33Y 10/00* (2014.12); *B33Y 30/00* (2014.12); *B33Y 50/02* (2014.12)

(58) Field of Classification Search
CPC .................................................. B29C 64/386
See application file for complete search history.

(56) References Cited

U.S. PATENT DOCUMENTS

| | | | |
|---|---|---|---|
| 2011/0079936 A1 | 4/2011 | Oxman | |
| 2013/0120355 A1* | 5/2013 | Joshi | ....................... G06T 17/10 |
| | | | 345/419 |

(Continued)

OTHER PUBLICATIONS

Banerjee, S., 15 Best 3D Printing Software You Should Opt For, published May 12, 2014, accessed Feb. 6, 2016 at http://www.rswebsols.com/tutorials/software-tutorials/15-best-3d-printing-software.

(Continued)

*Primary Examiner* — Larry W Thrower
(74) *Attorney, Agent, or Firm* — Stephen R. Otis

(57) ABSTRACT

One or more input/output devices accept user-inputted path instructions that specify a set of multiple deposition paths for an extruder to travel. An actuator actuates motion of the extruder along a trajectory that includes each of the deposition paths and also includes multiple non-deposition paths. For each deposition path: (a) the user-inputted path instructions specify a thickness of an object; and (b) the extruder extrudes the object in accordance with fabrication instructions computed by a computer based at least in part on the thickness. As the extruder moves over the entire trajectory, the extruder extrudes a set of objects, one object per deposition path. The objects adhere to each other to form an integral 3D structure. In some cases, the objects include functionally graded material.

10 Claims, 13 Drawing Sheets

(51) Int. Cl.
*B33Y 30/00* (2015.01)
*B33Y 50/02* (2015.01)
*B33Y 10/00* (2015.01)

(56) References Cited

U.S. PATENT DOCUMENTS

2014/0027952 A1   1/2014   Fan et al.
2014/0074272 A1   3/2014   Cowden, IV
2014/0134334 A1   5/2014   Pridoehl et al.

OTHER PUBLICATIONS

Compton, B., et al., 3D-Printing of Lightweight Cellular Composites; published in Advanced Materials, vol. 26, Issue 34, pp. 5930-5935, Sep. 10, 2014.

Keating, S., et al., Compound fabrication: A multi-functional robotic platform for digital design and fabrication; published in Robotics and Computer-Integrated Manufacturing, vol. 29, Issue 6, Dec. 2013, pp. 439-448.

Oxman, N., Variable Property Rapid Prototyping; published in Virtual and Physical Prototyping Mar. 2011; 6(1):3-31. DOI: 10.1080/17452759.2011.558588.

* cited by examiner

METHODS AND APPARATUS FOR ADDITIVE MANUFACTURING ALONG USER-SPECIFIED TOOLPATHS

RELATED APPLICATIONS

This application is a non-provisional of, and claims the benefit of the filing date of, U.S. Provisional Patent Application No. 62/050,724, filed Sep. 15, 2014, the entire disclosure of which is herein incorporated by reference.

FIELD OF TECHNOLOGY

The present invention relates generally to additive manufacturing along user-specified toolpaths.

SUMMARY

In illustrative implementations of this invention, an additive manufacturing system comprises an extruder, an actuator and I/O devices.

The I/O devices accept input from a user. The input includes user-inputted path instructions that specify a set of multiple deposition paths for an extruder to travel. For each of the deposition paths, the user-inputted path instructions specify parameters of an object to be extruded by the extruder while the extruder moves along the deposition path. For example, for a given deposition path, the parameters may specify a shape (sometimes called an extrusion geometry) of the object to be extruded during the deposition path. For example, specifying the shape of the object may comprise specifying a height or width of the object.

The actuator actuates motion of the extruder along a toolpath. The toolpath includes straight or curved segments in which the extruder extrudes material (deposition paths) and also includes straight or curved segments in which the extruder does not extrude material (non-deposition paths).

The deposition paths are specified by user-inputted path instructions. In many cases, deposition paths are interspersed between non-deposition paths. For example, in some cases, an extruder moving along a trajectory will move along a deposition path, then along a non-deposition path, and then along another deposition path.

In some cases, the actuator that moves the extruder is a robotic arm, and the extruder is attached to an end of the robotic arm. In some cases, the actuator comprises a conventional system of motors, gears, gantries and guide rails, such as those used in a conventional 3D printer to actuate motion of a fabrication tool. Alternatively, any type of motion system may be used to move the extruder.

In illustrative implementations, a computer computes fabrication instructions based at least in part on the user-inputted path instructions. The fabrication instructions control movement by the actuator and extrusion by the extruder. In some cases, the fabrication instructions specify (i) a pressure in the extruder or (ii) an extruder speed. The pressure or extruder speed control the shape (extrusion geometry) of the objects extruded.

As a result, in illustrative implementations, the extruder extrudes a set of objects, one object per deposition path. The extruded objects have shapes (extrusion geometries) specified by the user. After deposition, the extruded objects adhere to each other, such that together they form a 3D fabricated item that is an integral structure.

In illustrative implementations, the extruder includes one or more nozzles and multiple containers for storing multiple materials. In some cases, extrusion from the extruder is actuated by pneumatic or fluidic pressure. In some cases, extrusion from the extruder is actuated by screws or other solid objects that apply force against material to be extruded. Different types of nozzles may be used. For example, any of the following types of nozzles may be used: (a) a nozzle for single material extrusion, (b) a nozzle for extrusion of two parallel streams of material; (c) a nozzle for extruding a "co-axial" flow that has an inner core and outer sheath of different materials; or (d) a nozzle with a mixing chamber for mixing multiple materials to form a mixture and then to extrude the mixture.

In some implementations, the extruder extrudes functionally graded material—i.e., material that has material properties that vary as a function of spatial position within the material.

In illustrative implementations, an object extruded during a given deposition path has an extrusion geometry (e.g., height, width and length) specified by a user.

In some cases, the deposition paths (that the user inputs and the extruder travels) are 3D curves. For example, in some cases, an extruder extrudes a thick paste as it travels in 3D curves, to deposit material on a 3D curved mold.

In some cases, the extruder extrudes while moving in a 3D curve, without—during that 3D curve—completing the printing of all build points in the fabricated item at each of the levels intersected by the 3D curve. For example, in some cases: (a) at least one of the deposition paths is a 3D curve; (b) the 3D curve includes a first point and a second point, the second point being higher than the first point; and (c) as the extruder travels along the 3D curve, the extruder extrudes material at both the first and second points, even though the extruder has not yet completed extrusion at all build points that lie in a horizontal plane that intersects the first point.

In some cases, the user-inputted path instructions also specify material properties of one or more materials to be extruded during a deposition path. For example, in some cases, the instructions specify a concentration for a mixture that is extruded during the deposition path.

In some cases, the user-inputted path instructions also specify one or more system parameters of the additive manufacturing system. For example, in some cases, these system parameters include (i) a type of nozzle of the extruder, (ii) nozzle speed, and (iii) temperature.

In illustrative implementations, the present invention is quite different than sliced layer-by-layer deposition. In sliced layer-by-layer deposition: (1) a user specifies a 3D virtual model of the object to be fabricated, and does not specify toolpaths; (2) one or more computers slice the 3D virtual model into virtual slices, (3) one or more computers run a program to determine toolpaths (such as rastering) for a tool depositing material to travel, and (4) one or more computers control deposition of material, such that material is physically deposited layer-by-layer and each physical layer corresponds to one of the virtual slices.

Thus, in sliced layer-by-layer deposition, a user does not specify deposition paths, instead a computer runs a program to automatically (without user participation at that stage) calculate deposition paths. In contrast, in illustrative implementations of the present invention, a user specifies deposition paths for an extruder to travel and specifies, for each of the deposition paths, one or more parameters (such as vertical or horizontal thickness) of an object to be deposited as the extruder travels the deposition path.

The description of the present invention in the Summary and Abstract sections hereof is just a summary. It is intended only to give a general introduction to some illustrative implementations of this invention. It does not describe all of the details and variations of this invention. Likewise, the descriptions of this invention in the Field of Technology section and Field of Endeavor section are not limiting; instead they each identify, in a general, non-exclusive manner, a technology to which exemplary implementations of this invention generally relate. Likewise, the Title of this document does not limit the invention in any way; instead the Title is merely a general, non-exclusive way of referring to this invention. This invention may be implemented in many other ways.

The above Figures show some illustrative implementations of this invention, or provide information that relates to those implementations. However, this invention may be implemented in many other ways.

DETAILED DESCRIPTION

Additive Manufacturing System

Figure 1A:
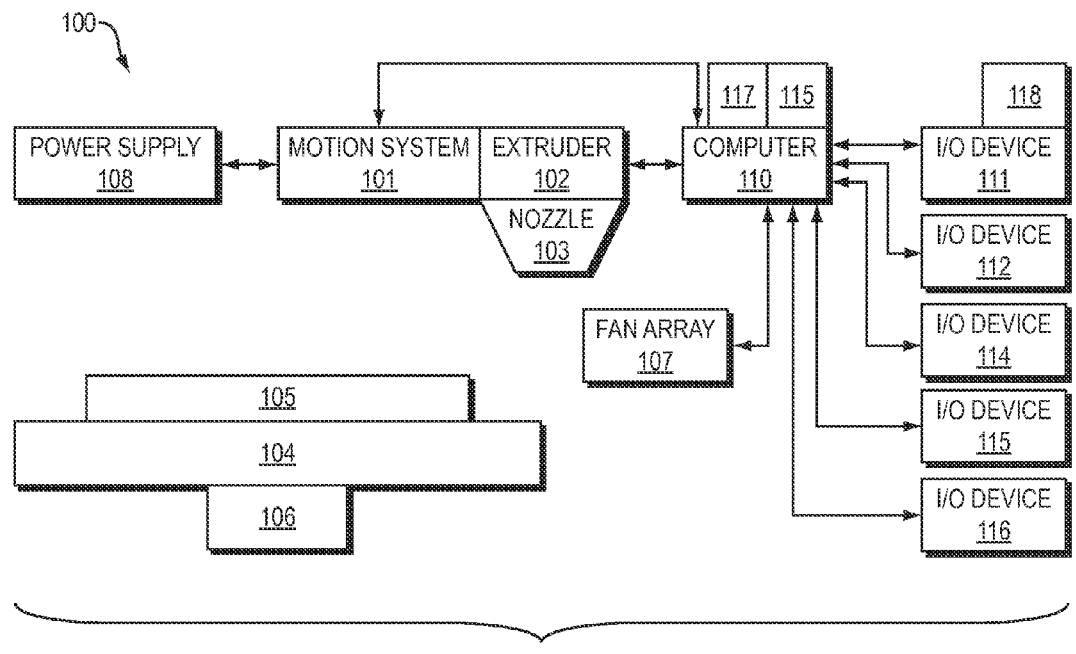
FIG. 1A is a block diagram of hardware components of an additive manufacturing system.

FIG. 1A is a block diagram of hardware components of an additive manufacturing system 100, in an illustrative implementation of this invention. In FIG. 1, an extruder 102 extrudes material through nozzle 103, while a motion system 101 actuates movement of the extruder 102 in two or three dimensions. The motion system 101 comprises an actuator for actuating motion of the extruder. For example, in some cases, the motion system 101 comprises a robotic arm, such as a robotic arm configured to move with six degrees of freedom. Alternatively, in some cases, the motion system 101 comprises one or more motors and other hardware for actuating 2D or 3D motion (such as motors and other hardware for actuating 2D or 3D motion that are found in existing art such as CNC mills and 3D printers). For example, in some cases the hardware in the motion system 101 comprises one or more (a) motors, (b) gears, linkage systems, or power trains, and (c) gantries. In some cases, the hardware in motion system 101 further comprises (a) one or more moveable stages, and (b) bearings, rails, bushings, bearings or other motion guides. One or more power supplies 108 provide power for components of additive manufacturing system 100. For example, in some cases, a power supply 108 provides electrical power for motion system 101 and extruder 102.

The object that is being formed by extrusion rests on a substrate 105, that in turn rests on deposition platform 104. In some implementations, an actuator 106 actuates motion (e.g., vertical motion) of the deposition platform 104. After material is extruded, a fan array 107 blows air over the extruded material, in order to speed up curing or drying of the extruded material.

One or more computers 110 control the operation of, or interface with, hardware components of additive manufacturing system 100. Among other things, computer 110 outputs signals to control motion system 101 and extruder 102, such that the motion system 101 moves the extruder 102 in a toolpath while the extruder 102 extrudes material at appropriate times.

A human user inputs instructions or other data via one or more I/O devices (e.g., 111, 112, 114, 115, 116). In some cases, one or more of the I/O devices (e.g., 111, 112, 114, 115, 116) outputs information in human readable form, such as by displaying a graphical user interface. For example, in some cases, the I/O devices (e.g., 111, 112, 114, 115, 116) include one or more of the following devices: a touch screen, other display screen, keyboard, mouse, microphone, speaker, haptic transducer or handheld controller (e.g., a controller that measures acceleration or motion of the controller). In some cases, wireless communication modules (e.g., 117, 118) wirelessly transmit and receive data, and are connected by wired or fiber optic communication links with other hardware components (e.g., computer 110 or I/O device 111) of the additive manufacturing system 100. The computer 110 stores data in, and accesses data from, an electronic memory device 115.

In some cases, after deposition, fan array 107 is moved near the deposition platform 104. The fan array 107 then blows air over the uncured extruded material. The air currents produced by the fan increase convection and thus the rate of evaporation of water from the uncured material, and thus reduce the time needed for the extruded material to harden.

Figure 1B:
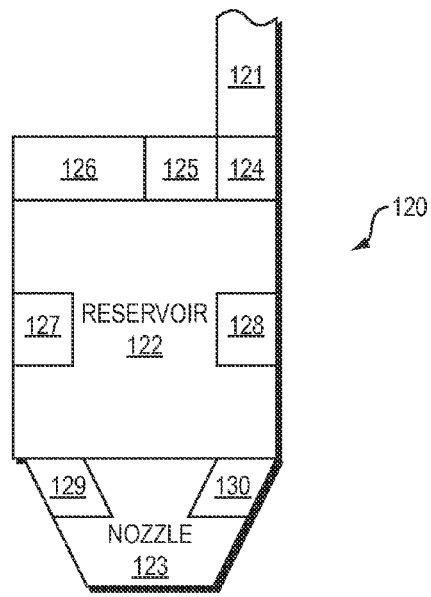
FIGS. 1B and 1C are block diagrams of extrusion systems.
Figure 1C:
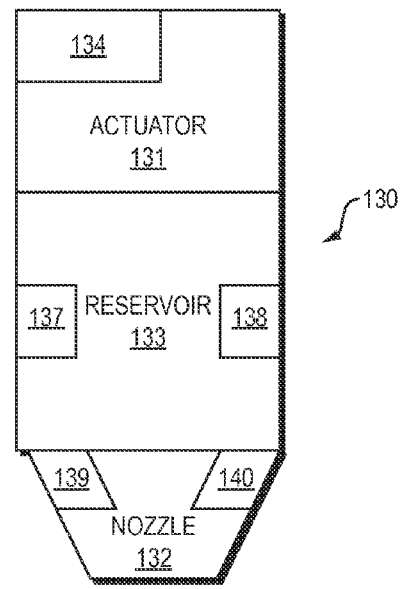

FIGS. 1B and 1C are block diagrams of extruders, in illustrative implementations of this invention.

FIG. 1B shows an example of an extruder 120 in which extrusion is actuated by fluidic or pneumatic pressure. In FIG. 1B, high-pressure fluid (e.g., air) enters reservoir 122 through hose 121, causing material in the reservoir to be extruded through one or more nozzles 123. One or more valves 124 regulate the pressure of fluid (e.g., air) entering reservoir 122. Closing or opening of the valve(s) 124 is actuated by one or more motors 125, which are controlled by a microcontroller 126, which is in turn controlled by computer 110. In some implementations, heating mechanisms 127, 128, 129, 130 heat material before it is extruded, causing it to be less viscous.

FIG. 1C shows an example of an extruder 130 in which extrusion is actuated by an actuator 131 that actuates movement of one or more solid hardware components that push, pull or otherwise apply mechanical pressure against, material and thereby cause the material to move and be extruded through one or more nozzles 132. For example, in some cases: (a) actuator 131 comprises one or more motors and one or more pumps, screws, gears, rams, or pistons; and (b) the one or more motors actuate the one or more pumps, screws, gears, rams, or pistons and thereby cause the material to move and be extruded. Actuator 131 is controlled by microcontroller 134 which is in turn controlled by computer 110. In some implementations, heating mechanisms 137, 138, 139, 140 heat material before it is extruded, causing it to be less viscous. In some cases: (a) actuator 131 applies pressure to actuate movement of solid feed (such as a filament) into a chamber where the material melts or softens into a liquid; and (b) the solid feed entering the chamber applies pressure against the liquid, causing the liquid to be extruded though a nozzle. In some cases, a heating chamber is inside a nozzle. In the example shown in FIG. 1C, the extruder 130 causes material stored in reservoir(s) 133 to be extruded.

In some implementations, the extruder is a multi-material extruder. For example, in some cases, each of the reservoirs (122, 132) comprises multiple containers, each of which stores a different material. In some implementations, the extruder includes multiple nozzles, and different materials are extruded through different nozzles. In some other cases, different materials are extruded through a single nozzle simultaneously (e.g., using coaxial nozzles, such that a column of material extruded the nozzle has an outer layer of a first material and an inner layer of a second material) or at different times (e.g., to extrude a functionally graded material).

More generally, in some cases, the extruder 130 comprises any existing art extrusion system, including any existing art extrusion system that extrudes material in any 3D printing or additive manufacturing process.

Figure 2A:
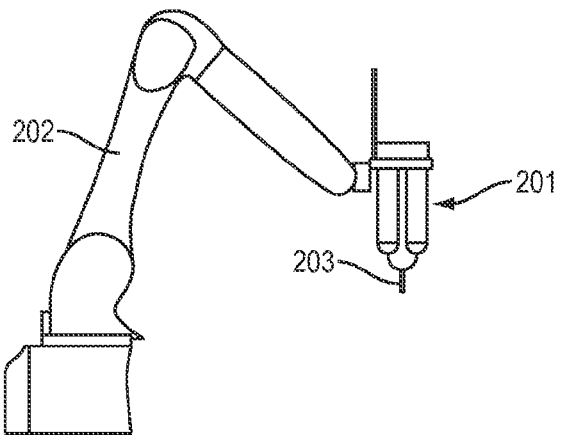
FIGS. 2A, 2B and 2C are a side view, top view and perspective view, respectively, of a robotic arm.
Figure 2B:
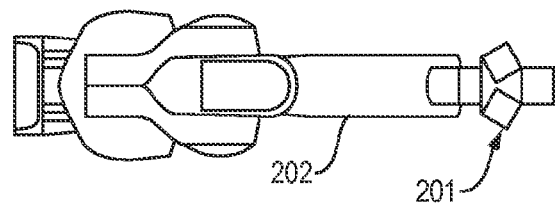
Figure 2C:
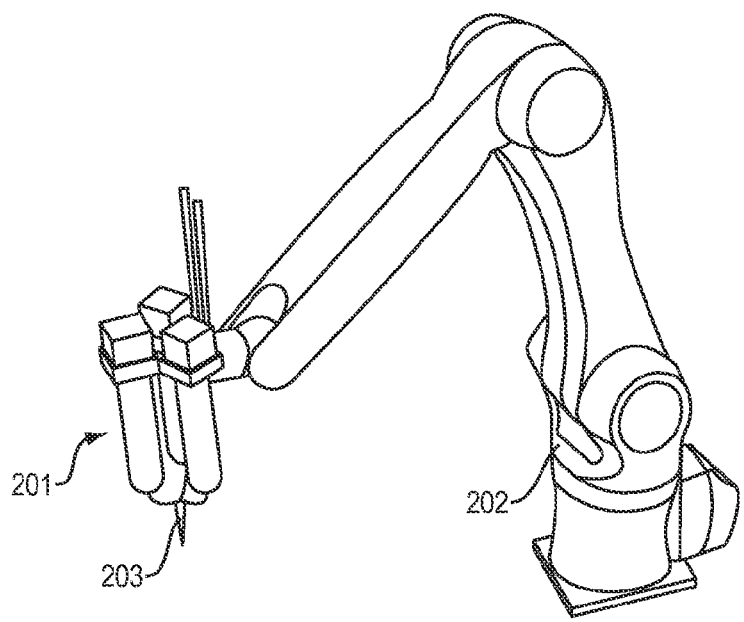

FIGS. 2A, 2B and 2C are a side view, top view and perspective view, respectively, of a robotic arm, in an illustrative implementation of this invention. A robotic arm 202 actuates motion of an extruder 201 that is attached to an end of the robotic arm 202. The robotic arm includes one or more motors, mechanical linkages, joints, and structural elements and one or more electronic computers (e.g., microcontrollers) for controlling motion of the robotic arm. The extruder 201 includes multiple reservoirs (e.g., for storing multiple different materials). The extruder 201 extrudes material through a nozzle 203.

Figure 3A:
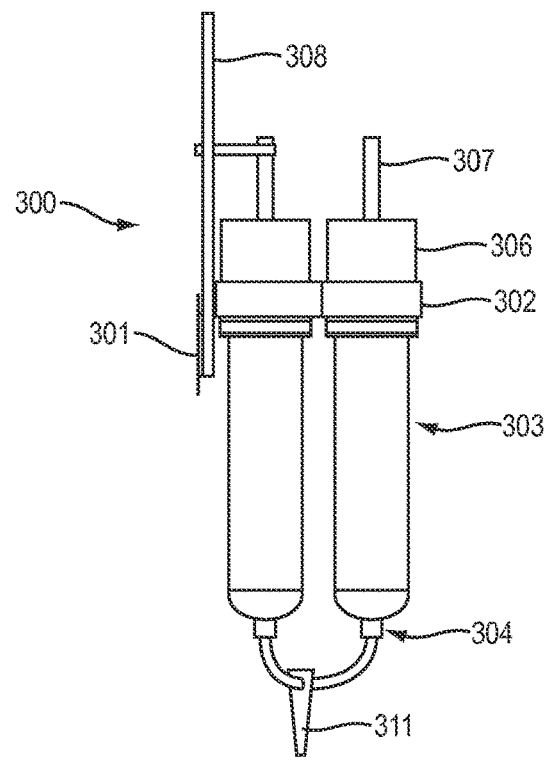
FIG. 3A shows an extruder, in which extrusion is actuated by electric motors.

FIG. 3A shows an extrusion system 300, in which extrusion is actuated by electric motors, in an illustrative implementation of this invention. In the example shown in FIG. 3A, stepper motors 306 actuate non-captive lead screws 307 that push material through a nozzle 311. The lead screws 307 are kept in alignment by lead plates 308.

Figure 3B:
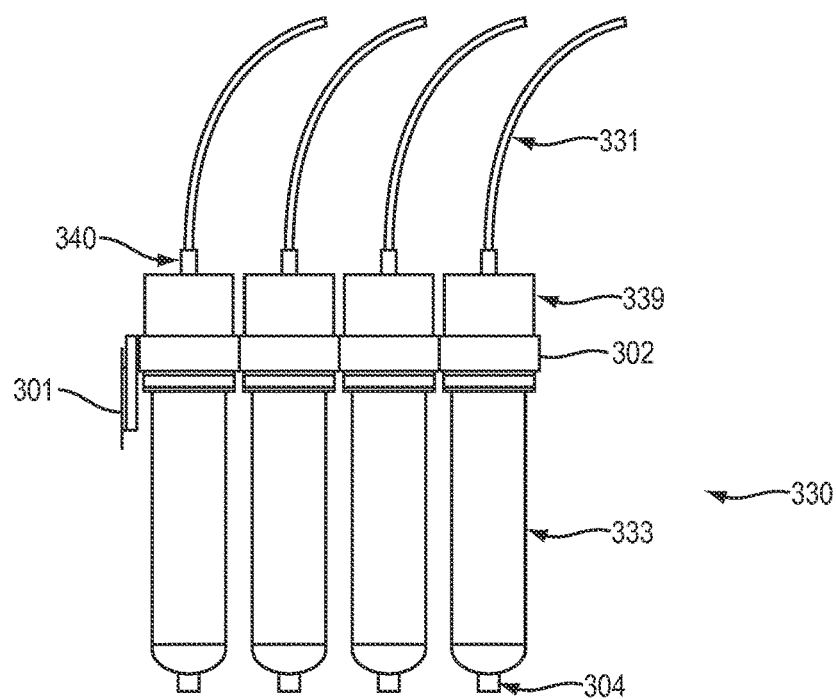
FIG. 3B shows an extruder, in which extrusion is actuated by pneumatic or fluidic pressure.

FIG. 3B shows an extrusion system 330, in which extrusion is actuated by pneumatic pressure, in an illustrative implementation of this invention. In the example shown in FIG. 3B, the extruder includes tubing 331, pressure regulators 339, and air fittings 340. Compressed air flows into the extruder 330 through the tubing 331. Each of the pressure regulators 339 (a) includes valves and motors that actuate the valves, and (b) is configured to regulate the pressure of air entering reservoirs 333. The compressed air exerts pressure against material in reservoirs 333, causing material to be extruded through a nozzle.

In the examples shown in FIGS. 3A and 3B, the material reservoirs (303, 333) are connected to a nozzle by connectors 304. Material reservoirs (303, 333) are held in place by a mounting plate 302 that is attached to a connection plate 301. The material reservoirs (e.g., 303, 333) may be fabricated from a wide variety of materials. For example, in some cases, the material reservoirs (e.g., 303, 333) comprise high-strength plastic, stainless steel or glass. The shape of the nozzle (e.g., 311) may vary. For example, the number and position of input or output orifices of a nozzle, the overall shape of a nozzle, and the connectors that a nozzle is configured to attach to, may vary and are not limited to that shown in FIGS. 3A and 3B.

This invention may be implemented with a wide variety of nozzle types. For example, FIGS. 4A, 4B, 4C and 4D show examples of different nozzle types, in illustrative implementations of this invention. Each of these FIGS. 4A, 4B, 4C and 4D), respectively, shows a type of nozzle that is attached to the extruder. Flow of material from each reservoir (e.g., 303, 333) may be actuated separately (either simultaneously or sequentially with flow from other reservoirs) such that one or more materials are extruded through a single nozzle at a given time (FIG. 4A), are parallel-extruded (FIG. 4B), are coaxially extruded (FIG. 4C), or are mixed and then extruded (FIG. 4D).

Figure 4A:
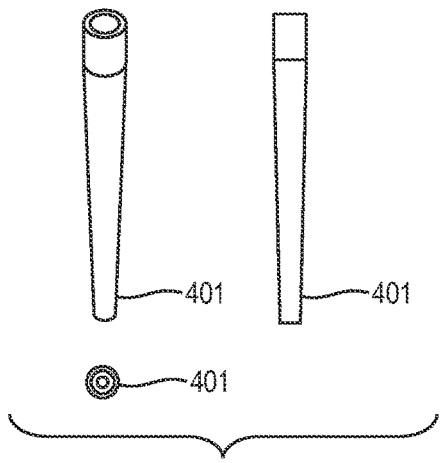
FIGS. 4A, 4B, 4C and 4D show different nozzle types.

In FIG. 4A, nozzle 401 is an example of a first type of nozzle, which extrudes a single material at a given instant of time. FIG. 4A shows perspective, cross-sectional and top views of nozzle 401.

Figure 4B:
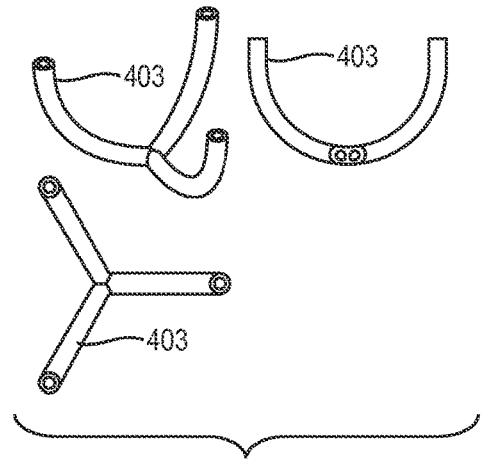

In FIG. 4B, nozzle 403 is an example of a second type of nozzle, which extrudes in parallel (e.g., extrudes a first column of a first material and simultaneously extrudes a second, parallel column of a second material). In many cases, the chamber of this second type of nozzle is short. FIG. 4B shows perspective, cross-sectional and top views of nozzle 403.

Figure 4C:
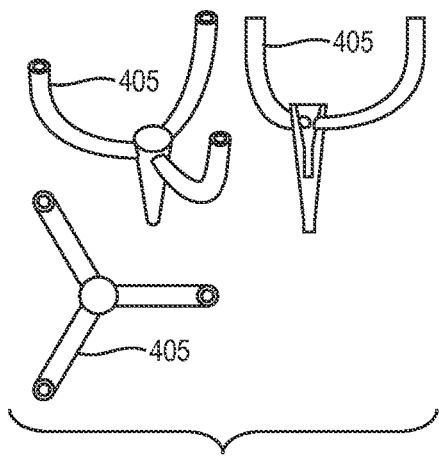
Figure 4D:
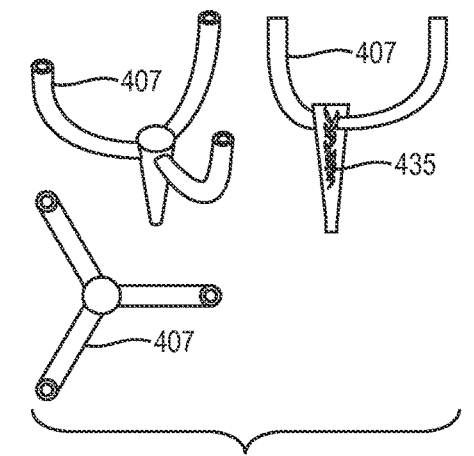

In FIG. 4C, nozzle 405 is an example of a third type of nozzle that simultaneously extrudes two different materials in a so-called "co-axial" pattern. In this "co-axial" pattern, an extruded object includes an inner core of a first material that is surrounded by an outer sheath of a second material. This third nozzle 405 includes a double chamber. FIG. 4C shows perspective, cross-sectional and top views of nozzle 405.

In FIG. 4D, nozzle 407 is an example of a fourth type of nozzle that mixes different materials from different reservoirs and then extrudes the mixture. For example, in some cases a screw 435 inside the nozzle mixes the materials. The screw is either static or moving relative to the rest of the nozzle. FIG. 4D shows perspective, cross-sectional and top views of nozzle 407.

In the examples shown in FIGS. 4A, 4B, 4C and 4D, the length and shape of the nozzles may vary. For example, the nozzles each have a bottom inner diameter. This bottom inner diameter may vary from nozzle to nozzle, even within a single type of nozzle, as appropriate for different viscosities of material extruded through the nozzle.

Extrusion According to User-Inputted Path Instructions

In illustrative implementations of this invention, a computer does not virtually "slice" a computer model of a 3D object into virtual layers, then automatically calculate toolpaths, and then control physical deposition of material, such that material is deposited layer-by-layer in accordance with the virtual slices.

Instead, a user inputs path instructions. These user-inputted path instructions specify: (a) a set of deposition paths to be traveled by an extruder while extruding; and (b) for each of the deposition paths, one or more parameters of an object extruded by the extruder while the extruder travels in the deposition path. For example, these parameters may specify a height or width of an object extruded in a deposition path.

Figure 5:
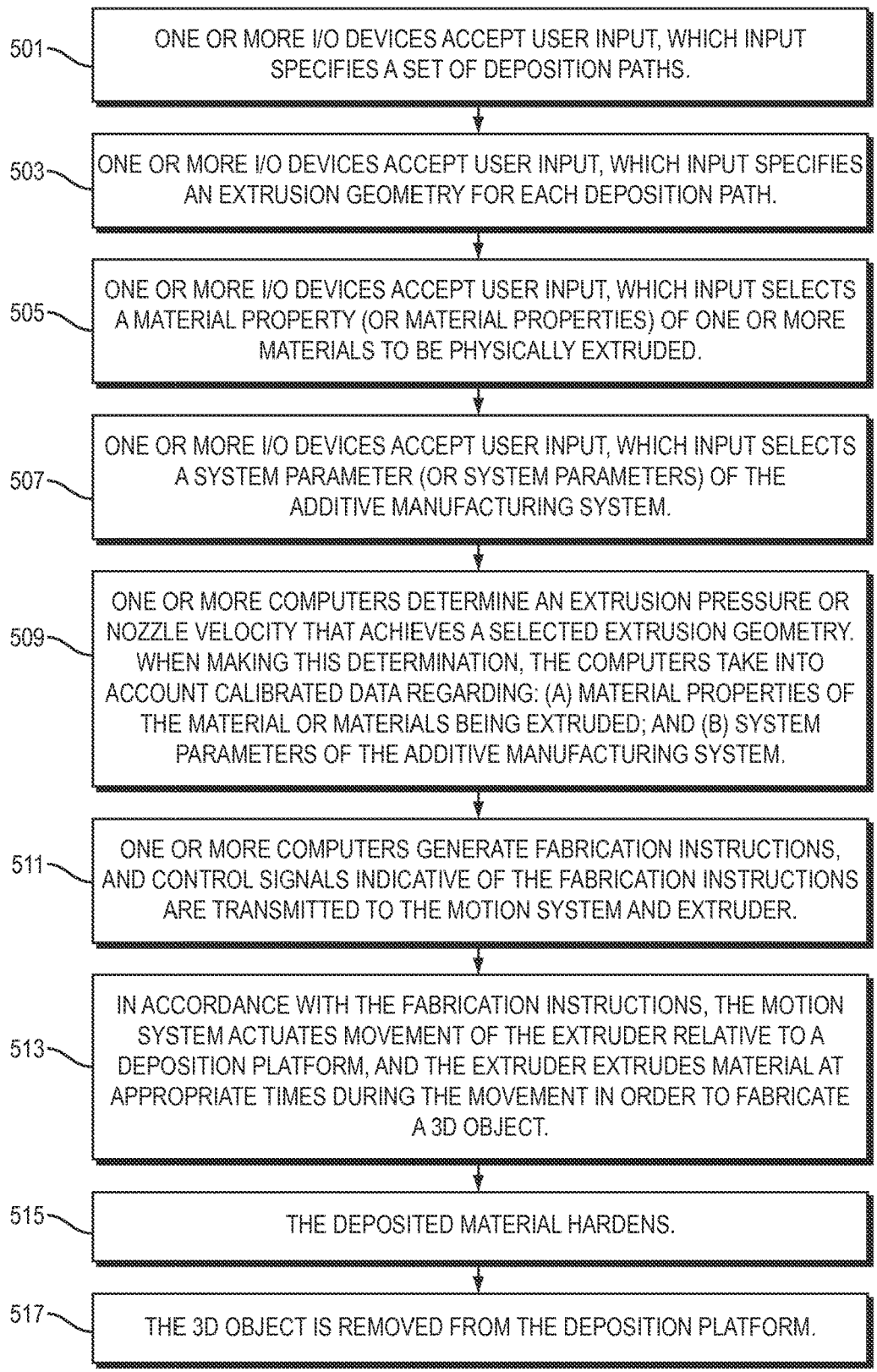
FIG. 5 is a flowchart that shows steps in a method of computer-controlled additive manufacturing.

FIG. 5 is a flowchart that shows steps in a method of computer-controlled additive manufacturing, in an illustrative implementation of this invention. The method shown in FIG. 5 allows a user: (a) to input an deposition path and parameters that directly or indirectly control height, width or other physical characteristics of an object extruded during the deposition path; and (b) to do so repeatedly, for each respective object in a set of objects that are extruded to fabricate a 3D object.

The method shown in FIG. 5 is an example of extrusion in accordance with user-inputted path instructions. The method includes the following steps: One or more I/O devices accept user input, which input specifies a set of deposition paths (Step 501). One or more I/O devices accept user input, which input specifies an extrusion geometry for each deposition path (Step 503). One or more I/O devices accept user input, which input selects a material property (or material properties) of one or more materials to be physically extruded (Step 505). One or more I/O devices accept user input, which input selects a system parameter (or system parameters) of the additive manufacturing system (Step 507) One or more computers determine an extrusion pressure or nozzle velocity that achieves a selected extrusion geometry. When making this determination, the computers take into account calibrated data regarding: (a) material properties of the material or materials being extruded; and (b) system parameters of the additive manufacturing system. (Step 509). One or more computers generate fabrication instructions, and control signals indicative of the fabrication instructions are transmitted to the motion system and extruder (Step 511). In accordance with the fabrication instructions, the motion system actuates movement of the extruder relative to a deposition platform, and the extruder extrudes material at appropriate times during the movement in order to fabricate a 3D object (Step 513). After the deposition, the deposited material hardens (Step 515). After the deposited material hardens, the 3D object is removed from the deposition platform (Step 517).

The steps shown in FIG. 5 are discussed in more detail below.

Step 501: User Selection of Toolpaths. In Step 501 of FIG. 5, one or more I/O devices accept user input, which input specifies a set of deposition paths. The deposition paths may comprise any type of curves. For example, in some cases, the deposition paths comprise lines, splines, polylines, or NURBS curves in a horizontal plane or in horizontal parallel planes. Alternatively, in some cases, the deposition paths comprise 3D curved lines, each of which does not lie entirely in a single plane.

The user inputs the deposition paths via one or more I/O devices, such as one or more of a touch screen, display screen, mouse, keyboard, and digital stylus. In many implementations, the user inputs each deposition path by using a graphical user interface to draw the deposition path via computer-aided modeling or via computer-aided scripting. The deposition path may be drawn in a variety of ways, such as such as interpolation, spline, or NURBS curve, or by moving along the entire path. Alternatively, a user inputs numeric values that represent coordinates of two or more points along the deposition path.

In many cases, a user may input instructions for a continuous deposition path or for a discontinuous extrusion path. For example, in some implementations, a user inputs instructions for a discontinuous extrusion path, in which extrusion occurs in some regions of the path and not in other regions of the path. For instance, in some cases, a user draws a straight or curved line that has spatial gaps (spatial discontinuities) between different segments of the line. In some cases, a user inputs instructions for a continuous deposition path, and then inputs instructions regarding how to make the path discontinuous—that is, specifies regions in which extrusion does not occur. For instance, in some cases, a user inputs an instruction that specifies a specific region in which extrusion does not occur, or inputs instructions for a dashed line.

In some cases, a user inputs instructions for a deposition path in which material properties of the extruded object change abruptly along the path, or in which shape (extrusion geometry) of the extruded object changes abruptly along the path.

In many implementations, extrusion of a 3D fabricated object does not occur in a single continuous deposition. Instead, an extruder deposits material in multiple separate deposition paths, and the extruded materials then adhere to each other to form a 3D fabricated object. In many cases, there is a deposition path, then a non-deposition path, then a deposition path, and so on. For example, at the end of a deposition path, an extruder may cease extruding and then move, without extruding, to the beginning of the next deposition path.

In some cases, thick paste-like materials are extruded on top of non-flat substrate surfaces such as 3D molds, in that case, the user may draw virtual 3D curves on top of a virtual representation of a 3D substrate.

In some cases: (a) a user specifies paths on each of multiple horizontal parallel planes; and (b) the paths that lie in each plane, respectively, correspond to a layer of the 3D object to be fabricated. Alternatively, in some cases: (a) a user specifies deposition paths on each of multiple curved surfaces; and (b) the deposition paths that lie in each curved surface, respectively, correspond to a layer of the 3D object to be fabricated. In both of these cases (multiple planes or multiple curved surfaces), deposition may physically occur in layers, similar in some respects to sliced layer-by-layer deposition. However, there are important differences. Among other things, in sliced layer-by-layer deposition: (a) a user does not select deposition paths to be traveled by an extruder; and (b) instead, a user specifies a virtual model of a 3D object to be fabricated, and then a computer runs a program in the background that automatically slices the virtual model into virtual slices and automatically determines paths to be traveled by an additive manufacturing device while fabricating the object. In contrast, in some illustrative implementations of this invention: (a) a user does not select a 3D model that is then virtually sliced by a program; and (b) instead, a user specifies deposition paths in each of multiple planes or multiple curved surfaces.

In some cases, a user initially specifies a single deposition path and then specifies how to repeat it. Among other things, a user may select (a) a shape of a deposition path; (b) orientation of a deposition path; (c) length of a deposition path; and (d) whether and how a deposition path is repeated in a plane or curved surface. For example, when selecting how a deposition path is to be repeated, a user may select path spacing or number of deposition paths in a layer.

Alternatively, in some cases, a user specifies a group of deposition paths and then specifies how to repeat the group. For example, in some cases, a user makes selections for a group of deposition paths (such as selecting shape, orientation, or length of the deposition paths in the group, or whether or how the group of deposition paths is to be repeated.)

In some implementations, end points and discontinuity points of a deposition path occur at grid points. As a user is drawing a deposition path, the end points of the path and other points on the path that a user specifies (such as a sharp bend) may automatically snap to the nearest grid point to facilitate user drawing.

In some implementations, a user specifies only those segments of the toolpath in which material will be deposited. In contrast, portions of a toolpath in which no deposition will occur are calculated by a computer.

In many use scenarios, the deposition paths in a single horizontal plane are spaced apart from each other and do not intersect. If deposition paths are close enough to each other, the resulting extruded objects touch each other (due to spreading out after deposition) and adhere to each other, so that, after hardening, the objects together form a single 3D fabricated item. Even if extruded objects do not touch each other in a particular horizontal plane, they may adhere to other extruded objects in other horizontal planes such that all of the extruded objects adhere to form a single 3D fabricated item.

In some implementations, a user is not allowed to specify deposition paths that intersect and that lie entirely in the same horizontal plane. In some other cases, the user is allowed to select such intersections. In some cases, a user is allowed to specify intersecting deposition paths that lie entirely in the same horizontal plane, and the user is allowed or required to specify the order in which the intersecting deposition paths are traversed. By specifying this order, the user thereby determines, for the objects that are extruded during the intersecting deposition paths, which object will cross over the other object(s).

In some implementations, a computer may, at periodic intervals during fabrication of a 3D object, determine, for each of a set of column regions of the 3D object: (a) a current height of the 3D object in that column region; and (b) determine a vertical height of the extruder needed in order to vertically clear that current height.

Step 503: User Input Regarding Extrusion Geometry. In Step 503 in FIG. 5, one or more I/O devices accept user input, which input specifies an extrusion geometry for each selected deposition path. Each extrusion geometry describes a shape (such as height or width) of an extruded object. In some cases, the height and width are constant over the length of the object. In other cases, the height or width varies over the length of the object. For example, the height or width may vary in discrete increments or continuously, and variation may be exponential, sinusoidal or in another pattern.

In some cases, a user selects from a menu of calibrated extrusion geometries in a database. In some cases, each extrusion geometry in the menu specifies height or width for all or a portion of an extruded object. The height or width of the selected geometry may be variable or constant.

In other cases, a user specifies a particular extrusion geometry by specifying a constant height or width for all or a portion of an extruded object, which constant height or width is in a calibrated range of heights or widths stored in the database. In other cases, a user specifies a particular extrusion geometry by specifying how height or width varies over all or a portion of an extruded object, within a calibrated range of heights and widths stored in the database.

Later in the additive manufacturing process, different extrusion geometries are physically effectuated by varying one or both of (a) the pressure at which material is extruded from the extruder and (b) nozzle speed (i.e. the rate at which the extruder moves relative to the deposition platform). Which pressure or nozzle velocity results in a given extrusion geometry (i.e., a given height or width of an extruded object) depends on system parameters of the additive manufacturing system and on of material properties of the material or materials being extruded from the extruder.

Step 505: User Input Regarding Material Properties. In Step 505 in FIG. 5, one or more I/O devices accept user input, which input selects a material property (or material properties) of one or more materials to be physically extruded (Step 505). For example, a user may select material properties that comprise one or more of the following: (a) type of material (e.g., a particular type of hydogel); (b) a concentration for a mixture or solution, or (c) the concentrations of two different solutions to be mixed to form a solution with an intermediate concentration (e.g., mixing a 3% concentration and a 4% concentration to achieve a 3.5% concentration). For example, in some cases, the concentration may be mass concentration (i.e., ratio of mass of a component of a solution to the volume of the total solution, sometimes denoted as w/v or w/v %). Or, for example, a user may specify material properties for each material extruded by a multi-material nozzle, such as: (a) material properties of materials that comprise the core and sheath, respectively, of an object extruded by a coaxial nozzle 409; and (b) material properties of materials that comprise two parallel regions in a single object extruded by a parallel extrusion nozzle 405. Also, for example, a user may specify how material properties vary as a function of spatial position within extruded material. Alternatively, in Step 505, a user may specify a desired viscosity, shear modulus, or dynamic modulus, and a computer may select a material with the desired viscosity, shear modulus, or dynamic modulus.

In many cases: (a) Step 505 is optional; and (b) if a user does not input material properties, then default material properties are automatically selected by a computer.

Step 507: User Input Regarding System Parameters. In Step 507 in FIG. 5, one or more I/O devices accept user input, which input selects a system parameter (or system parameters) of the additive manufacturing system For example, in some cases, a user selects one or more of the following: (a) nozzle type (e.g., single material, parallel, co-axial, or mixer); (b) nozzle speed (that is, the speed of the extruder nozzle relative to the deposition platform), within a range of calibrated nozzle speeds; and (c) temperature (in cases where the system includes one or more heat sources for controllably heating materials to be extruded), within a range of calibrated temperatures.

In many cases: (a) Step 507 is optional; and (b) if a user does not input system parameters that are user selectable, then default system parameters are automatically selected by a computer.

Steps 505 and 507 may occur at any time in the method set forth in FIG. 5, including before Steps 501 and 503. Obviously, however, for Steps 505 and 507 to affect the extrusion of a specific object, they must occur before the specific object is extruded.

Step 509: Computation of Pressure or Nozzle Velocity Needed to Achieve Extrusion Geometry. In Step 509 of FIG. 5, a computer determines an extrusion pressure or nozzle velocity that achieves a selected extrusion geometry (e.g., achieves a specified vertical thickness or horizontal thickness of an extruded object. When making this determination, the computer takes into account calibrated data regarding: (a) material properties of the material or materials being extruded; and (b) system parameters of the additive manufacturing system. For example, in some cases, the higher the viscosity of the material being extruded, the slower the nozzle velocity or the higher the pressure needed to achieve a given extrusion geometry.

In some cases, Step 509 involves a computer accessing a look-up table that is pre-calibrated to map a selected extrusion geometry to pressure or to nozzle velocity, where the mapping depends on pre-calibrated values of other variables. The other variables may include (a) a material property (or material properties) of one or more materials to be extruded and (b) one or more system parameters of the additive manufacturing system. For example, the mapping (from extrusion geometry to pressure or nozzle velocity) may depend on: (a) the type of material to be extruded, and (b) the nozzle type to be used.

In some cases, the mapping (a) maps a tuple of independent variables to pressure, (b) maps a tuple of independent variables to nozzle speed (i.e., speed of an extruder nozzle relative to a deposition platform), or (c) maps a tuple of independent variables to an ordered pair of pressure and nozzle speed. The independent variables that are used in the mapping include: (a) a selected extrusion geometry and (b) one or more other variables, which variables include one or more material properties and one or more system parameters. The data points for the mapping are determined by calibration. In many cases, the calibration is done in advance.

In illustrative implementations, the pressure or nozzle velocity to which a given extrusion geometry is mapped are each in a range limited by physical constraints of the additive manufacturing system. For example, in some cases: (a) the additive manufacturing system is designed to operate at pressures between 0.5 PSI and 120 PSI and at nozzle velocities between 5 mm/s and 40 mm/s; and (b) thus the database maps extrusion geometries only to pressures or nozzle velocities that fall in these ranges.

Similarly, the selections that a user is allowed to input in Steps 501, 503, 505 and 507 are limited by physical constraints of the additive manufacturing system or the materials being extruded. For example, in some cases, when a user specifies deposition paths, the deposition paths must be in a volume that is limited by the range of physical motion of the extruder. Likewise, in some cases, the minimum permitted spacing between deposition paths that a user may select is limited by tolerances (e.g., 0.06 mm) for motion of the extruder. Similarly, in some cases, the ranges of the extrusion geometry (e.g., maximum and minimum height and width of an extruded object) that a user may select is limited by the range of sizes of the nozzles (e.g., 0.1 mm to 7 mm). Furthermore, in some cases, if a user has selected a particular extrusion geometry, then a user may select only nozzles that have an appropriate size—that is, a size such that the nozzle is able to produce that extrusion geometry. For example, in some cases, if a user has selected an extrusion geometry that specifies a small height and small width for an extruded object, then a user is not allowed to select a nozzle type that is too large to extrude that geometry.

Step 511: Fabrication Instructions. In Step 511 in FIG. 5, one or more computers generate fabrication instructions, and control signals indicative of the fabrication instructions are transmitted to the motion system and extruder (Step 511). The control signals may be transmitted wirelessly, by wire, or by fiber optics. The control signals cause movement and extrusion to be synchronized: as the extruder moves, extrusion occurs at appropriate times and thus at appropriate spatial positions, such that the extruded material forms the 3D object being fabricated.

In illustrative implementations, one or more computers calculate the fabrication instructions based at least in part on (i) deposition paths and extrusion geometries selected by a user, and (ii) pressure or nozzle speed for achieving a given extrusion geometry, taking into account values of a set of material properties and a set of system parameters.

In some cases, the fabrication instructions include instructions to actuate one or more of the following motions: (i) motion of an extruder to a single target position while extruding, (ii) motion of an extruder to a sequence of target positions while extruding, (iii) motion while not extruding, (iv) reservoir 203 refill motions; and (v) motions that actuate fabrication (such as extrusion) or that control position or orientation of a fabrication tool (such as an extruder).

In some cases, the fabrication instructions that control the extruder include one or more of the following: extrusion initial delay, extrusion final delay, reservoir 203 to be actuated, and instructions for pneumatic valves or electrical motors to actuate extrusion.

In illustrative implementations, one or more computers execute a software program in order to generate the fabrication instructions; and (b) this software program is compatible with a wide variety of motion systems and extruders. For example, in some cases, the software program is compatible with many different systems that comprise a multi-barrel or single-barrel extruder that is attached to a positioning platform that operates at least in 3-axis. The software program may be written in any of a wide variety of programming languages.

In illustrative implementations, the fabrication instructions (including instructions regarding pressure and nozzle speed) are outputted in a format that is in (or is compatible with) a driver input language for the drivers of the motion system and the extruder.

In some implementations, fabrication instructions are transmitted to the extruder via serial USB communication. In some cases, the extruder is attached to the motion system and includes a multi-barrel head actuated by pneumatic or mechanical hardware and circuitry.

In some cases in which extrusion is pneumatically actuated, bits are transmitted from a microcontroller to relay boards that control solenoid valves connected to a vacuum pump, and a pressure regulator receives a constant supply of airflow from an air compressor. Each valve outputs pressure to a given material barrel. Pressure levels enable start and stop deposition with positive and negative pressure respectively. The pressure regulator controls the pressure outputted by each valve, in accordance with pressure instructions included in the fabrication instructions. In some cases, controlled variation of pneumatic pressure determines different regional extrusion geometries with tunable heights and widths along a deposition path.

In some cases, firmware (e.g., a microcontroller performing a program encoded in read-only-memory) onboard the extruder takes fabrication instructions as an input. The firmware outputs instructions that control a digital extrusion pressure regulator (e.g., a pneumatically-actuated or screw-actuated regulator), such that the regulator regulates extrusion pressure at discrete time intervals. In some cases, the digital regulator's pressure response (P) is calibrated in advance, using input values from 0 to 4000 of type 16-bit unsigned integer, that correspond to 4 to 20 mA of electrical current (I). A linear interpolation is then performed as follows; $I=I0+(I1-I0)*(P-P0/P1-P0)$, where I is current of a control signal that is outputted by the firmware, P is pressure outputted by the pressure regulator, I0b is minimum current, I1 is maximum current, P0 is minimum pressure, and P1 is maximum pressure. Alternatively, a microcontroller controls a digital pressure regulator by varying voltage of a signal sent to the regulator.

In some cases, fabrication instructions that control motion are transmitted to a motion system (e.g., every 0.012 s) via an Ethernet UDP socket, TCP socket, or serial communication. These instructions cause the motion system to actuate motion of the extruder, such that the extruder follow depositions paths made of points, lines, poly-lines or curves, starting from a point in space. (The starting point is sometimes called home). The fabrication instructions may, among other things: (a) specify one or more target points in a toolpath; (b) provide an instruction to stop or specify how long to remain stopped at a point; (c) specify a speed of motion; and (d) include an instruction for a reservoir refill motion. In addition, in some cases, fabrication instructions for the motion system specify one or more of the following: position of the extruder at each interval of time (e.g., once every 0.012 s), extruder position angle, extrusion geometry, minimum and maximum voltage (mapped to extrusion pressure), and time dedicated to extrusion at crucial path points.

In some cases, firmware (e.g., a microcontroller that is onboard a motion system and that is performing a program encoded in read-only-memory) takes fabrication instructions as an input, and outputs instructions that control motors in the motion system, which motors actuate robotic arm joints, or computer numerical control gantries, or vertical movement of a deposition platform.

In some cases, the fabrication instructions comprise time and flow mapping instructions that transform simple curve primitives into 3D extrusion shapes with variable height and width along deposition paths.

In illustrative implementations, the fabrication instructions include "point-to-point" instructions that specify state(s) of the motion system and extruder at points along one or more extrusion trajectories.

In illustrative implementations, the fabrication instructions are transmitted to the motion system and extruder directly and seamlessly, without using a conventional intermediary software program (such as gcode or a slicer program) that slices a 3D computer model (such as an STL file) or translates it into instructions for the extruder or motion system. In alternative implementations, a conventional intermediary software program (such as gcode) is used.

Step 513: Deposition. In Step 513 in FIG. 5, in accordance with the fabrication instructions, the motion system actuates movement of the extruder relative to a deposition platform, and the extruder extrudes material at certain times during the movement in order to fabricate a 3D object (Step 515).

One or more reservoirs (e.g., 122, 123, 303, 333) in the extruder contain material. During the deposition sequence, this material is extruded through one or more nozzles (e.g., 103, 123, 132, 203 or 311) of the extruder.

In some cases, materials from multiple reservoirs are mixed in a mixing chamber of the extruder. The rate of flow (into the mixing chamber) of each material to be mixed together is separately controlled, in such a manner as to control the concentration of the resulting mixture. In some cases, a mixing chamber is positioned in a nozzle. In some cases, a dynamically-actuated mixing chamber in the extruder mixes two or more materials from reservoirs. In some cases, flow of material from the reservoirs is actuated, such that different materials from different reservoirs are mixed together as they flow past a static mixing screw in the mixing chamber.

A wide variety of materials may be extruded. For example, in some cases, the extruded material or extruded materials comprise one or more of the following: viscous water-based solutions or colloids, such as chitosan, sodium alginate, and polyvinyl alcohol, or other hydro-gels, organic resins or natural composites. In some cases, water-based materials are stored in air-tight extruder containers at room temperature, cure at room temperature by natural evaporation once out of the extruder, and comprise base matrixes of hydro-gels, organic resins, polyvinyl alcohols, clay, plaster, or concrete combined with granular or fibrous filler materials. Alternatively, the material or materials that are extruded may comprise non-water-based gels and pastes that may be extruded at room temperature and then later cure.

In some cases, a fluid is extruded, and the dynamic viscosity of the fluid at the time of extrusion ranges from 5000 cP to 250,000 cP at room temperature. For example, in some cases the mass concentration of an extruded solution is in a range between 0.01 to 0.12.

In some implementations, one or more of the materials that are extruded are not fluid at room temperature, such as polylactic acid (PLA), polycarbonate (PC), acrylonitrile butadiene styrene (ABS), or nylon. Heating mechanisms (e.g., 127, 128, 129, 130, 137, 138, 139, 140) may be positioned in or adjacent to a nozzle to controllably modify the viscosity of such materials as they are extruded. For example, in some cases, the heating mechanisms (e.g., 127, 128, 129, 130, 137, 138, 139, 140) comprise resistive heating elements, induction heaters or Peltier heaters.

For example, in some implementations, the extruder is configured for fused deposition modeling (FDM), and includes a heated nozzle and a material feed to extrude thermoplastics used in FDM such as PLA or ABS. The extruder may include a heated nozzle and a material feed to extrude thermoplastics used in fused deposition modeling (FDM) such as poly-lactic acid (PLA), acrylonitrile butadiene styrene (ABS), nylon etc.

Step 515: Hardening. In Step 515 in FIG. 5, after the deposition sequence, the deposited material hardens.

In some cases where water-based materials are extruded, the materials harden in less than 24 hours, as water evaporates from the materials. The evaporation of water (and hardening of the deposited material) may be accelerated by increasing convection. For example, in some cases, an array of computer-controlled fans blows air over the deposited material in order to increase convection and decrease the time needed for evaporation. In some cases, a fan array (a) is as wide as the deposition platform onto which the extruded 3D object was extruded, and (b) is positioned, while it blows air over the extruded object, at a distance of about 50 cm from the deposition platform. In some cases, each fan in the array is connected to a microcontroller output signal pin that is controlled by computer for selective actuation of that fan. Alternatively, all fans may be connected to the same power supply controller, in order actuate all of the fans simultaneously. Selective actuation of fans in the fan array (i.e., actuation of some but not all of the fans) causes different portions of the 3D object being fabricated to harden at different rates. An advantage of selective actuation of the fans is that, in some cases, it prevents dehydration or excessive wetness that may otherwise weaken the 3D object.

In some cases, the 3D object is left to harden (e.g., overnight) without assistive convection of a fan array.

In some alternative implementations (e.g., implementations involving FDM), a heated soft thermoplastic is extruded and cures (hardens) as the thermoplastic cools.

Step 517: Removal from Deposition Platform. In Step 517 in FIG. 5, after the 3D object hardens, it is removed from the deposition platform.

Figure 6:
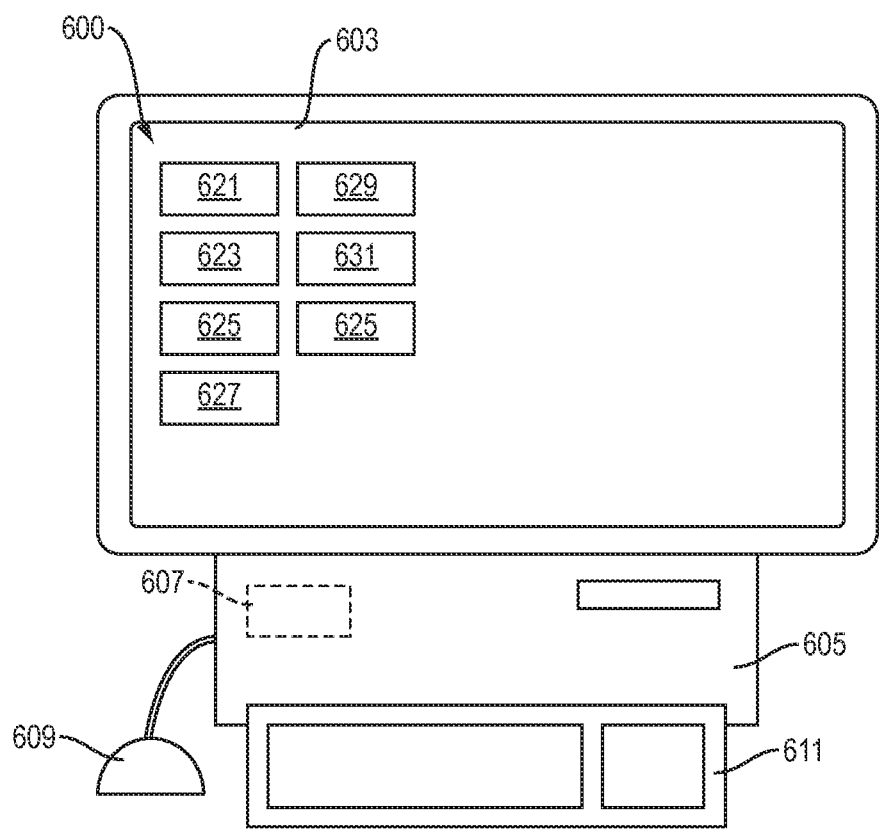
FIG. 6 shows an interactive graphical user interface.

FIG. 6 shows an interactive user interface, in an illustrative implementation of this invention. The interface 600 is displayed on an electronic display screen 603 controlled by a computer 605 with electronic memory 607. In order to interact with the interface, a user provides input via a mouse 609 and keyboard 611. Alternatively, screen 603 is a touch screen and a user may provide input by touching the screen.

In the example shown in FIG. 6, the screen 603 displays a set of icons. The set includes an icon for each of the following: (a) a 3D virtual model of the object to be fabricated 621; (b) a deposition path representation 623; (c) how the construct would appear in un-cured state 625; (d) the anticipated final result of the print once the deposited materials hardens 627; (e) status of motion system, including position, nozzle speed, and a display of the toolpath being followed, including past and future positions in the toolpath 629; (f) status of extruder, including extrusion pressure and whether extrusion is currently occurring 631; (g) storage containers and material supplies, including the amount and type of materials in containers in the extruder, remaining operating time before a refill is needed, and refill movements 633; and (h) status of communications, such as communications between a computer and the motion system and communications between a computer and the extruder 635. If a user selects one of the icons, then the screen displays information about the subject matter to which that icon relates.

Among other things, if a user selects the icon regarding path representation 623, the screen shows an interactive display for drawing deposition paths.

Figure 7:
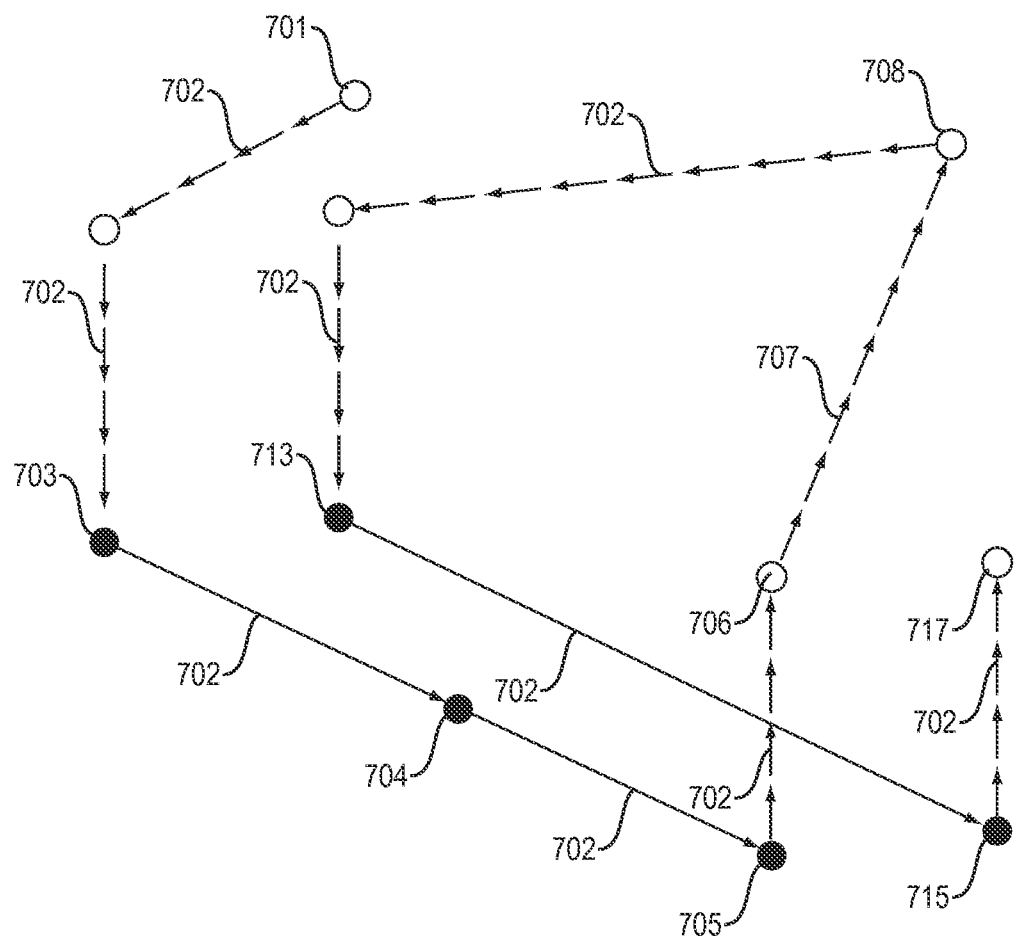
FIG. 7 shows a toolpath.

FIG. 7 shows a toolpath, in an illustrative implementation of this invention. The toolpath starts at point 701 and ends at point 717. The toolpath includes two portions (a first deposition path from point 703 to point 705, and a second deposition path from point 713 to point 715) during which the extruder extrudes material. The toolpath includes three other portions (non-deposition paths from point 701 to 703, from point 705 to point 713, and from point 715 to point 717, respectively) during which the extruder does not extrude material.

The motion system's home 701 is the three-dimensional point at which an instruction set starts. From there, the motion system actuates a movement 702 of the extruder to the first extrusion start point 703. At start point 703, both an extrusion system instruction and a static instruction are sent to the extrusion system 101 and to the motion system 102, respectively. The extrusion instruction encodes time-related data as well as minimum and maximum extrusion force data. The time-related data in the extrusion instruction may include the hardware response time, the time it takes for the material to start extruding, the time it takes for special path ends (such as at points 810 and 811 in FIG. 8A) to be extruded, and the time it takes to extrude along the path. The static instruction encodes the number of cycles for the motion system 102 to stay in place and takes into account from the extrusion instruction, the hardware response time, the time it takes for the material to start extruding, and the time it takes for special path ends to be extruded.

Then instructions are sent for a movement 702 of the extruder from point 703 to point 704, and then another instruction is sent for a movement 702 from point 704 to point 705. At target 705 (which is the endpoint of the first deposition path in which extrusion occurs), another static instruction is sent to the motion system 102 encoding the number of cycles for the motion system 102 to stay in place while the extrusion system 101 takes action to finalize the extrusion.

After the first deposition path is completed, another 702 motion instruction is sent to move the extruder to point 706. Then the extrusion system 101 checks for material refill needs and, if needed, the motion system executes a material refill motion 707 to a refill three-dimensional point 708 away from the deposited materials. At the refill point 708, materials are provided to the extrusion system 101. Then the motion system actuates more motions 702 to take the extruder to start point 713 of the second deposition path.

In some cases, instructions for movement include data specifying the total length of a deposition path and specifying one or more targets (a target being a point on the deposition path). This ensures continuity of extrusion no matter the complexity of the deposition path.

Figure 8A:
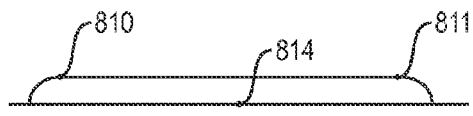
FIGS. 8A, 8B, 8C, 8D, 8E and 8F show examples of extrusion geometries.
Figure 8B:
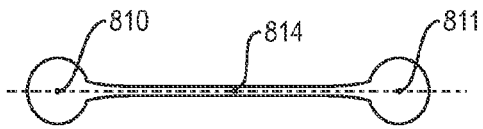
Figure 8C:
Figure 8D:
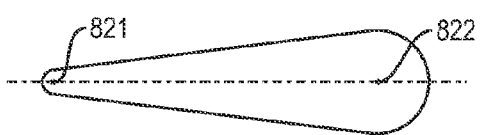
Figure 8E:
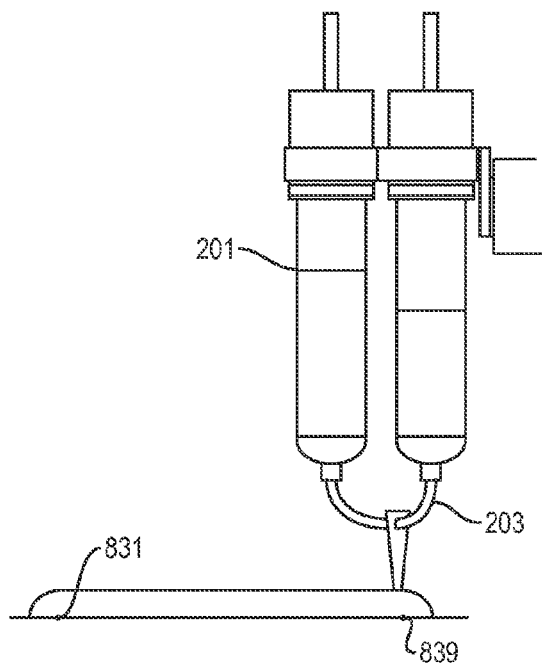
Figure 8F:
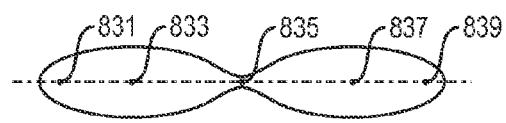

FIGS. 8A to 8F show examples of extrusion geometries, in an illustrative implementation of this invention. In FIGS. 8B, 8D and 8F, the dashed lines represent the deposition path traveled by the center of a nozzle of the extruder.

FIGS. 8A and 8B are a side view and a top view of a first extruded object. The first object is extruded during a single continuous extrusion. FIG. 8A shows that the first object has a constant height from point 810 to point 811. FIG. 8B shows that the first object has a variable width. As shown in FIG. 8B, the first object is wider at points 810 and 811 than at point 814. Thus, the width of the first object varies over the length of the first extruded object.

FIGS. 8C and 8D are a side view and a top view of a second extruded object. The second object is extruded during a single continuous extrusion. FIG. 8C shows that the second object has a variable height: the height increases from point 821 to point 823. FIG. 8D shows that the second object has a variable width: the width increases from point 821 to point 823. Thus, both the height and width of the second object varies over the length of the second object.

FIGS. 8E and 8F are a side view and a top view of a third extruded object. The third object is extruded during a single continuous extrusion. FIG. 8E shows that the third object has a constant height from point 831 to point 835. FIG. 8F shows that the third object has a variable width. As shown in FIG. 8F, the third object is wider at points 833 and 837 than at points 831, 835 and 839. Thus, the width of the third object varies over the length of the third object.

In illustrative implementations, increasing extrusion pressure tends to increase the rate of material flow through the extruder nozzle, and thus tends to increase the amount of material extruded in a given region of the toolpath, and thus (if the extruded material is sufficiently viscous) tends to increase both the height and width of the extruded object in that region.

Similarly, decreasing the nozzle speed tends to increase the amount of time that the extruder spends over a given region of the toolpath, and thus tends to increase the amount of material extruded in the region and thus (if the extruded material is sufficiently viscous) tends to increase both the height and width of the extruded object in that region.

The maximum height of an extruded object depends on, among other things, the viscosity of the material when extruded. The lower the viscosity, the lower the maximum possible height of a single extruded object.

Thus, in some cases (such as shown in FIGS. 8A, 8B, 8E and 8F), if the extruded material is less viscous, then increasing extrusion pressure or decreasing nozzle speed in a region of a toolpath tends to cause the extruded object to be wider in that region but not to be higher. The increased pressure or decreased speed increases the amount of material deposited in the region. Because of the lower viscosity, however, the additional material does not make the extruded object higher in the region, but instead makes the object wider in the region as the material spreads out.

In some implementations (e.g., FIGS. 8A-8F), vertical or horizontal thickness of an extruded object varies within a single extruded object. In some implementations, vertical or horizontal thickness of extruded objects (which objects adhere to each other to form a 3D fabricated article) vary from extruded object to extruded object. In some implementations, a user inputs an extrusion geometry, including a vertical or horizontal thickness of the extruded object. In some implementations, user-specified path instructions specify an extrusion geometry, including a vertical or horizontal thickness of the extruded object.

Figure 9:
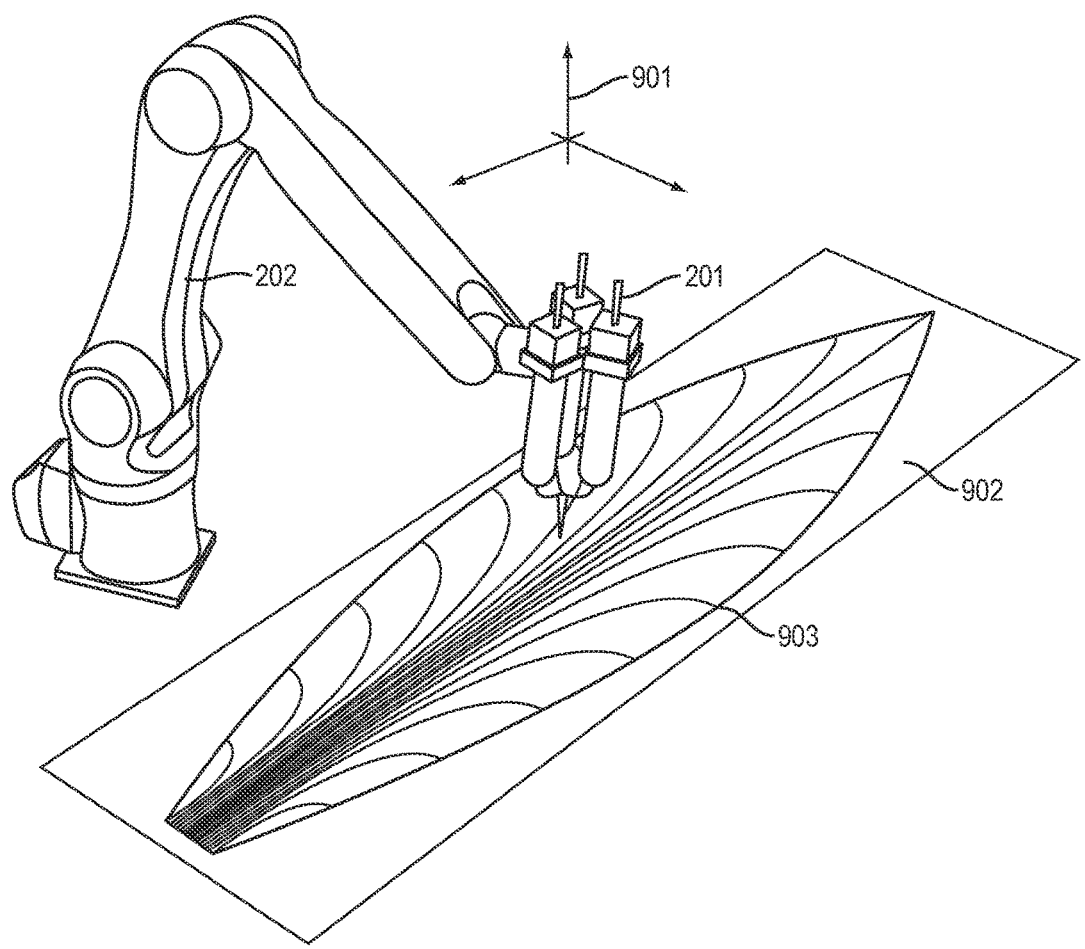
FIG. 9 shows an additive manufacturing system that is fabricating a 3D object.

FIG. 9 shows an additive manufacturing system fabricating a 3D object, in an illustrative implementation of this invention. In the example shown in FIG. 9, a motion system 202 moves an extruder 201 in three spatial dimensions 901. The extruder deposits multiple materials on top of a substrate 902 generating a functionally graded structure 903, depicted as a series of different thickness curves. The differentiation of the structure may be achieved by varying the properties of the multiple materials extruded, by varying the amount of material layers, or by extruding different geometries in height and width. The extruder deposits material such that material properties of the deposited material varies, as a function of spatial position within the deposited material, either continuously, discontinuously or discretely.

Figure 10A:
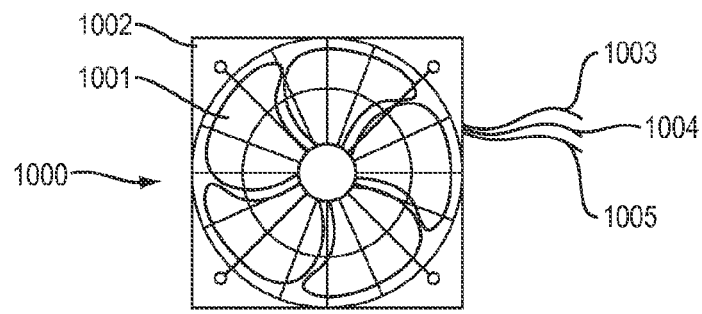
FIGS. 10A, 10B and 10C illustrate a fan array.
Figure 10B:
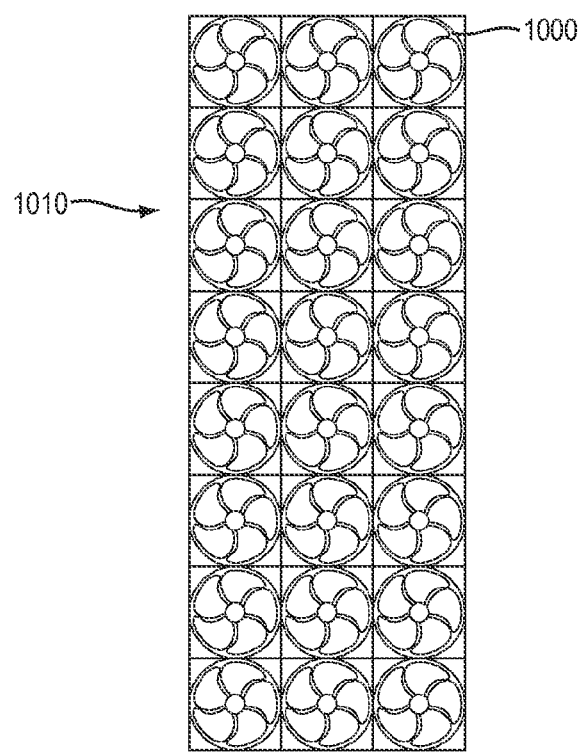
Figure 10C:
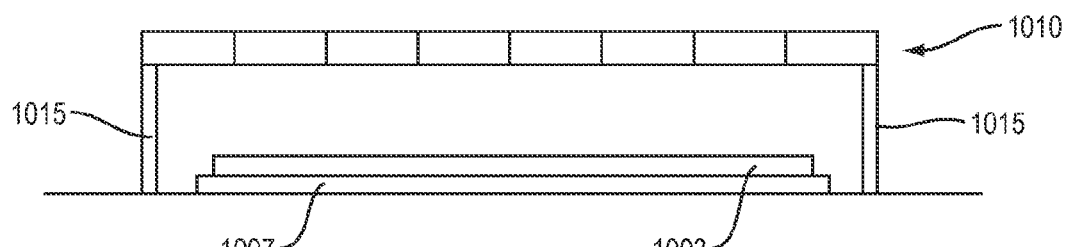

FIGS. 10A, 10B and 10C illustrate a fan array. FIG. 10A shows a single fan unit 1000 in the fan array. The fan unit 1000 includes fan blades 1001, and a structure 1002 that houses a motor to actuate the fan blades 1001. Each fan unit has a wired link 1003 to a power source, a wired communications link 1004 to one or more other devices, and a ground wire 1005. FIG. 10B shows a top view of fan array 1010. This fan array 1010 comprises multiple fan units, including fan unit 1000. In FIG. 10C, extrusion is complete, and uncured extruded material 1003 is resting on a substrate 1007. In order to speed evaporation of water from the extruded material 1003, fan array 1010 has been moved over the uncured extruded material. The air currents produced by the fan array increase convection and thus the evaporation rate. Fan array 1010 is held up by support structure 1015.

Figure 11A:
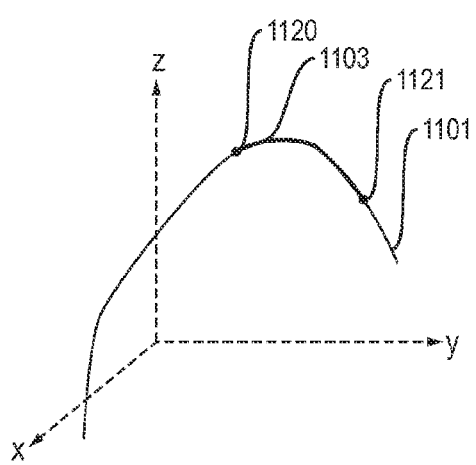
FIG. 11A shows a non-limiting example of a 3D curve.
Figure 11B:
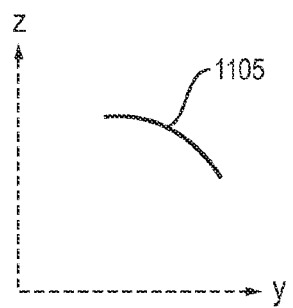
FIGS. 11B, 11C and 11D show a projection of a region of the curve onto the yz, xz and xy planes, respectively.
Figure 11C:
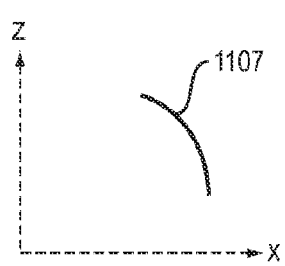
Figure 11D:
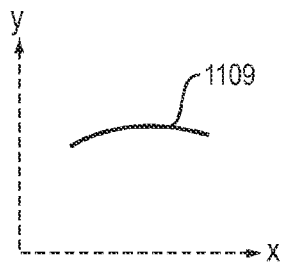

FIG. 11A shows an example of a 3D curve 1101. The 3D curve 1101 includes region 1103 between points 1120 and 1121. FIG. 11B shows an orthographic projection 1105 of region 1103 onto the yz plane. FIG. 11C shows an orthographic projection 1107 of region 1103 onto the xz plane. FIG. 11D shows an orthographic projection 1109 of region 1103 onto the xy plane. In the example shown in FIGS. 11B, 11C and 11D, the projections 1105, 1107 and 1109 are curved.

Figure 12:
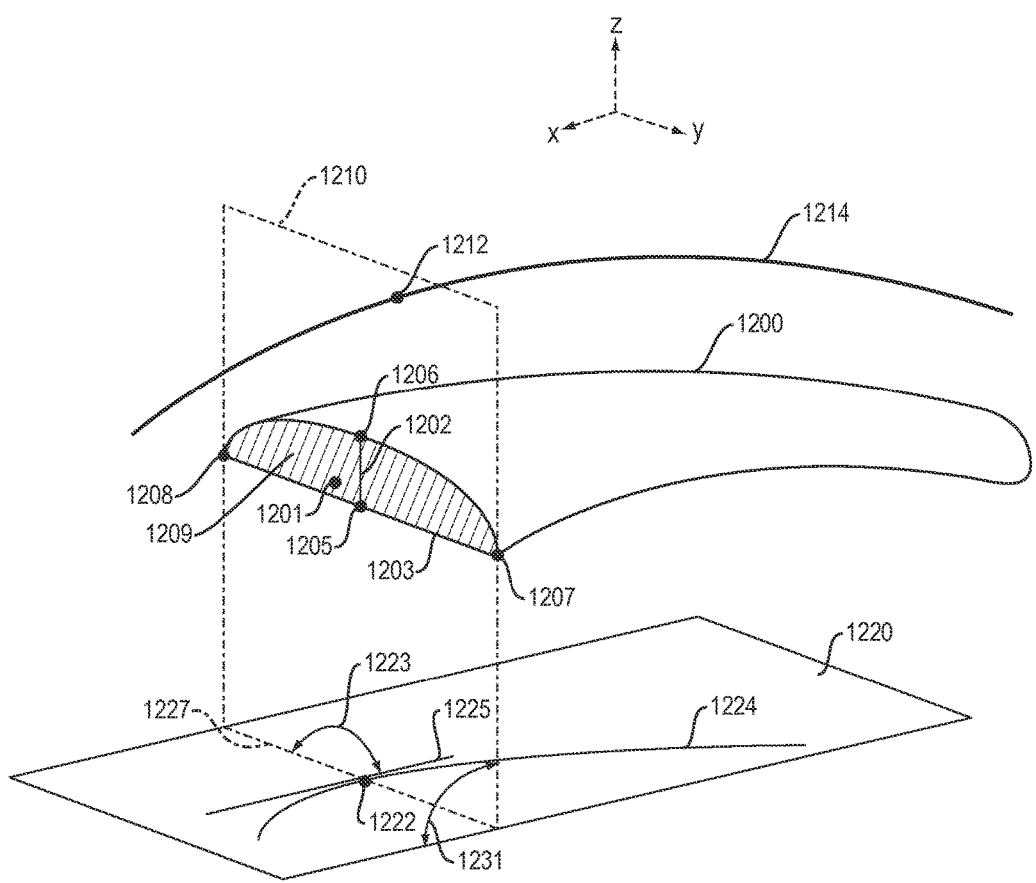
FIG. 12 shows an example of cross-sectional height and cross-sectional width of an extruded object.

FIG. 12 shows an example of cross-sectional height and cross-sectional width of an extruded object. In FIG. 12, the cross-sectional height of extruded object 1200 at point 1201 is the length of vertical line segment 1202. In FIG. 12, the cross-sectional width of extruded object 1200 at Point A (1201) is the length of horizontal line segment 1203. Vertical line segment 1202 has endpoints at 1205 and 1206. Horizontal line segment 1203 has endpoints at 1207 and 1208. In FIG. 12, vertical line segment 1202 is the longest line segment with both endpoints in cross-sectional region 1209; and horizontal line segment 1203 is the longest line segment with both endpoints in cross-sectional region 1209. In FIG. 12, cross-sectional region 1209 is the intersection of a vertical plane 1210 and the extruded object 1200. Extrusion point 1212 is a point on the deposition path 1215 and is where the extruder was positioned when extruding the material now located at point A (1201). Curve 1224 is the orthographic projection of deposition path 1214 onto horizontal plane 1220. Point 1222 is the orthographic projection of extrusion point 1212 onto horizontal plane 1220. Line 1225 is tangent to curve 1224 at point 1222. The intersection of the horizontal plane 1220 and vertical plane 1210 lies in line 1227. Vertical plane 1210 is perpendicular to line 1224. Angles 1231 and 1233 are each 90 degree angles. Angle 1231 is the angle between vertical plane 1210 and horizontal plane 1220. Angle 1223 is the angle between line 1225 and line 1227.

In some implementations (e.g., FIGS. 8A-8F), cross-sectional height or cross-sectional width of an extruded object varies within a single extruded object. In some implementations, cross-sectional height or cross-sectional width of extruded objects (which objects adhere to each other to form a 3D fabricated article) vary from extruded object to extruded object. In some implementations, a user inputs an extrusion geometry, including a cross-sectional height or a cross-sectional width of the extruded object. In some implementations, user-specified path instructions specify an extrusion geometry, including a cross-sectional height or a cross-sectional width of the extruded object.

Figure 13A:
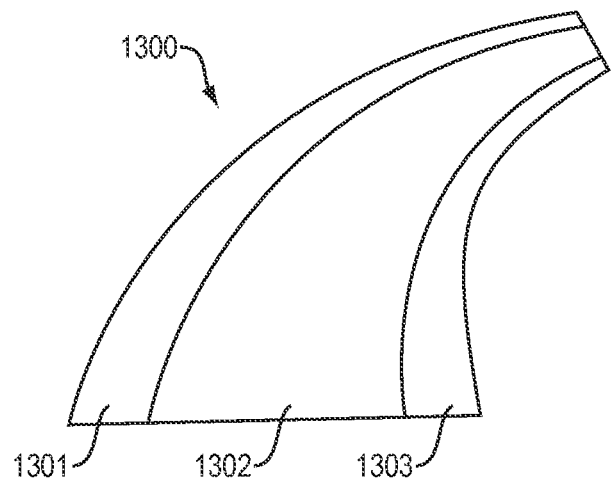
FIG. 13A and FIG. 13B are a top view and perspective view, respectively, of multiple extruded objects that adhere together to form a 3D fabricated object.
Figure 13B:
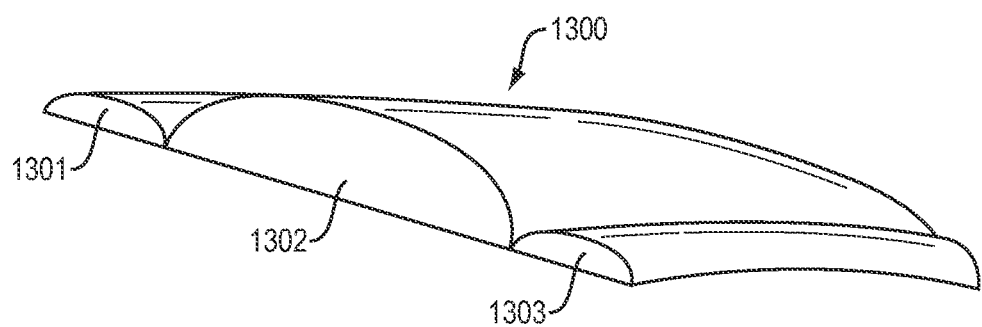

FIG. 13A and FIG. 13B are a top view and perspective view, respectively, of multiple extruded objects that adhere together to form a 3D fabricated object, in an illustrative implementation of this invention. Three extruded objects 1301, 1302, 1303 were extruded in three deposition paths, one object per path. In the example shown in FIGS. 13A and 13B: (a) extruded object 1301 was extruded only while the extruder was moving in a first deposition path; (b) extruded object 1302 was extruded only while the extruder was moving in a second deposition path; and (c) extruded object 1303 was extruded only while the extruder was moving in a third deposition path (the first, second and third deposition paths being different from each other and not intersecting). After being extruded, extruded objects 1301, 1302, 1303 adhered to each other. Specifically, object 1301 adhered to object 1302; and object 1302 adhered to object 1303, such that the three objects together formed an integral (unitary) 3D fabricated object 1300.

Applications

In illustrative implementations, this invention may be used for additive manufacturing of functionally graded objects or systems such as: medical bandages, lightweight containers, packaging elements, human exoskeleton systems, facade panels, large architectural parts, and biodegradable life support environments. For example, the functionally graded objects produced by the additive manufacturing may have material properties that spatially vary to transition from compression-bearing to tensile-bearing areas, opaque to transparent areas, lightweight to heavy areas or brittle to ductile areas.

Field of Endeavor and Problem Faced by the Inventors

A field of endeavor of this invention is extrusion along user-specified toolpaths.

The inventors were faced by a problem: The problem is how to perform additive manufacturing by extrusion, without using sliced layer-by-layer deposition. (The inventors did not want sliced layer-by-layer deposition, due to its disadvantages.)

In sliced layer-by-layer deposition, one or more computers virtually "slice" a computer model of a 3D object and then control deposition of material, such that material is physically deposited layer-by-layer and each physical layer corresponds to a virtual slice.

Sliced layer-by-layer deposition has numerous disadvantages. Among other things, it typically results in structural weakness. Furthermore, sliced layer-by-layer deposition does not facilitate an extruder performing a single continuous extrusion while the extruder moves in a 3D curve that does not include all of the build points of the fabricated 3D item.

The inventors solved this problem (of how to perform additive manufacturing by extrusion, without using sliced layer-by-layer deposition) in the manner set forth in the following two paragraphs:

In illustrative implementations of this invention, a computer does not virtually "slice" a computer model of a 3D object into virtual layers, then automatically calculate toolpaths, and then control physical deposition of material, such that material is deposited layer-by-layer in accordance with the virtual slices.

Instead, a user inputs path instructions. These user-inputted path instructions specify: (a) a set of deposition paths to be traveled by an extruder while extruding; and (b) for each of the deposition paths, one or more parameters of an object extruded by the extruder while the extruder travels in the deposition path. For example, these parameters may specify the height or width of an object extruded in a deposition path.

This approach (of extrusion in accordance with user-inputted path instructions) has at least four practical benefits, in illustrative implementations of this invention:

First, in many cases, this approach increases structural strength. Specifically, in many cases using this approach, a set of extruded objects adhere to each other (or partially fuse with each other) and harden, forming a 3D fabricated object that is stronger than would be achieved by conventional layer-by-layer 3D printing of the same object with the same materials. Without being limited by theory, the increased structural strength of the 3D fabricated objects appears to be due, in many cases, to the fact that: (a) each extruded object in the set comprises a single integral component, (b) polymer molecules in each of extruded object tend to align with each other along the direction of print; and (c) the extruded objects are aligned to strengthen the 3D object in regions and directions where stress and strain is greatest on the 3D object.

Second, in this approach, an extruder may travel in a curved deposition path while continuously extruding a single extruded object such that the centerline of the object, after being deposited, forms a 3D curve. For example, in some cases, the extruder travels in a 3D curve while extruding a thick, paste-like material over a 3D curved mold. Thus, the extruder may, while continuously extruding material over a 3D curved path, move vertically from a first height to a second height and then to a third height, without first completely printing a layer at the first height and then completely printing a layer at the second height. Of course, this is not done in conventional sliced layer-by-layer deposition.

Third, in this approach (of extrusion in accordance with user-inputted path instructions), physical parameters (such as height, width, hardness, color, and type of material) of an extruded object are controllable and may vary from one spatial position to another. Thus, this approach may be used to fabricate functionally graded materials. The variation in material properties may be continuous or may occur in discrete steps.

Fourth, this approach (of extrusion in accordance with user-inputted path instructions) facilitates an intuitive user experience for controlling additive fabrication, in cases where the 3D object to be fabricated is conveniently described by a human user as a set of deposition paths and by physical parameters of extruded objects along the paths. In contrast, in conventional sliced layer-by-layer deposition: (1) a user specifies a 3D virtual model of the object to be fabricated, rather than specifying toolpaths; (2) then a computer "slices" the 3D virtual model into virtual slices, and (3) then the computer runs a program in the background to automatically (without user involvement at that stage) determine a toolpath (such as rastering) for an extruder to travel.

Computers

In exemplary implementations of this invention, one or more electronic computers (e.g. 110, 126, 134, 605) are programmed and specially adapted: (1) to control the operation of, or interface with, hardware components of an additive manufacturing apparatus, including a motion system, an extruder, and user interface hardware; (2) to calculate extrusion pressure or nozzle speed for achieving a given extrusion geometry; (3) to generate fabrication instructions based, at least in part, on user-inputted path (or tool) instructions and on pressure or nozzle speed; (4) to control or interface with hardware for displaying a user interface and for receiving user input; (5) to receive signals indicative of human input, including input specifying deposition paths, extrusion geometries, material properties and system parameters; (6) to output signals for controlling transducers for outputting information in human perceivable format; and (7) to process data, to perform computations, to execute any algorithm or software, and to control the read or write of data to and from memory devices. The one or more computers may be in any position or positions within or outside of the additive manufacturing system. For example, in some cases (a) at least one computer is housed in or together with other components of the additive manufacturing system, such as a motion system or an extruder, and (b) at least one computer is remote from other components of the additive manufacturing system. The one or more computers are connected to each other or to other components in the additive manufacturing system either: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied above. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium comprises a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, computer function or computer task described or implied above. For example, in some cases, instructions encoded in a tangible, non-transitory, computer-accessible medium comprise instructions for a computer to: (1) to control the operation of, or interface with, hardware components of an additive manufacturing apparatus, including a motion system, an extruder, and user interface hardware; (2) to calculate extrusion pressure or nozzle speed for achieving a given extrusion geometry; (3) to generate fabrication instructions based, at least in part, on user-inputted path (or tool) instructions and on pressure or nozzle speed; (4) to control or interface with hardware for displaying a user interface and for receiving user input; (5)

to receive signals indicative of human input, including input specifying deposition paths, extrusion geometries, material properties and system parameters; (6) to output signals for controlling transducers for outputting information in human perceivable format; and (7) to process data, to perform computations, to execute any algorithm or software, and to control the read or write of data to and from memory devices.

Network Communication

In illustrative implementations of this invention, an electronic device (e.g., 110, 111, 112, 113, 114, 115, 116, 126, 134, 605) is configured for wireless or wired communication with other electronic devices in a network.

For example, in some cases, a computer 110 and I/O device 111 each include (or interface with) a wireless communication module for wireless communication with other electronic devices in a network. Each wireless communication module (e.g, 117, 118) includes (a) one or more antennas, (b) one or more wireless transceivers, transmitters or receivers, and (c) signal processing circuitry. The wireless communication module receives and transmits data in accordance with one or more wireless standards.

In some cases, one or more of the following hardware components are used for network communication: a computer bus, a computer port, network connection, network interface device, host adapter, wireless module, wireless card, signal processor, modem, router, computer port, cables or wiring.

In some cases, one or more computers (e.g., 110, 126, 134, 605) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTS (long term evolution)), or other IEEE communication standard.

I/O Devices

In illustrative implementations, an additive manufacturing system includes, or interfaces with, I/O devices (e.g., 111, 112, 114, 115, 116, 609, 611). For example, in some cases, the I/O devices comprise one or more of the following: touch screens, cameras, microphones, speakers, accelerometers, gyroscopes, magnetometers, inertial measurement units, pressure sensors, touch sensors, capacitive sensors, buttons, dials, sliders, transducers (e.g., haptic transducers), graphical user interfaces, electronic display screens, and projectors.

In illustrative implementations, a human inputs data or instructions via one or more I/O devices. One or more computers output data or instructions via one or more I/O devices.

Actuators

In illustrative implementations, the additive manufacturing system includes actuators. For example, in some cases: (a) one or more actuators in a motion system move the extruder; and (B) one or more actuators in an extruder actuate one or more screws, gears, rams or pistons that cause material to be extruded through a nozzle.

In illustrative implementations, each actuator (including each actuator for actuating any movement) is any kind of actuator, including a linear, rotary, electrical, piezoelectric, electro-active polymer, mechanical or electro-mechanical actuator. In some cases, the actuator includes and is powered by an electrical motor, including any stepper motor or servomotor. In some cases, the actuator includes a gear assembly, drive train, pivot, joint, rod, arm, or other component for transmitting motion. In some cases, one or more sensors are used to detect position, displacement or other data for feedback to one of more of the actuators.

Definitions

The terms "a" and "an", when modifying a noun, do not imply that only one of the noun exists.

To say that a process is "in accordance with" instructions means that signals encoding or derived from the instructions are used to control hardware performing the process. To say that a process is "in accordance with" instructions does not mean that actual performance must exactly match specifications in the instructions. For example, hardware operating within tolerances may perform in a manner that does not exactly match the specifications.

"Additive fabrication" of an object means fabrication of the object, such that mass or volume of the object is greater immediately after the fabrication than immediately before the fabrication.

A non-limiting example of two objects "adhering" to each other is where two objects partially or wholly fuse together.

To compute "based on" specified data means to perform a computation that takes the specified data as an input.

A "build point" of a 3D fabricated article means a point in the article at which the article is solid when fabrication of the article is complete.

A "centerline" may be curved or straight. For example, if a garden hose has been bent into a curved shape, then the centerline of the hose is curved.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Concentration" means (a) mass concentration, molar concentration, volume concentration, mass fraction, molar fraction or volume fraction, or (b) a ratio of the mass or volume of one component in a mixture or solution to the mass or volume of another component in the mixture or solution X "corresponds to" Y if the position of the components of X relative to each other is the same (except for scaling, if any) as the position of the components of Y relative to each other. For purposes of the preceding sentence: (a) if X is a virtual model, then the position of a given component of X is the position of the given component as indicated by data in the virtual model; and likewise (b) if Y is a virtual model, then the position of a specific component of Y is the position of the specific component as indicated by data in the virtual model.

"Cross-sectional height" of an extruded object, at a specific point (Point A) in the extruded object, means the length of the longest vertical line that has two endpoints in a cross-sectional region. Likewise, "cross-sectional width" of an extruded object, at a specific point (Point A) in the extruded object, means the length of the longest horizontal line that has two endpoints in a cross-sectional region. For purposes of the preceding two sentences, the cross-sectional region is determined as follows: Locate the point (the "extrusion point") in the deposition path where the extruder was positioned when extruding material onto Point A. Curve A is an orthographic projection of the deposition path onto a horizontal plane H. Point B is a point on Curve A and is the orthographic projection of the extrusion point onto horizontal plane H. Line B is a line in horizontal plane H that is tangent to Curve A at Point B. (However, if a tangent to Curve A does not exist at Point B, then Line B is the line in Plane B that is tangent to the deposition curve at the nearest preceding point in Curve A where a tangent to Curve A does exist. A "preceding" point means an orthographic projection onto horizontal plane H of a point in the deposition path that the extruder reached before arriving at the extrusion point.) Determine the vertical plane that is perpendicular to Line B. The cross-sectional region is the intersection of the extruded object and the vertical plane. For a fabricated object that is not an extruded object, the "cross-sectional height" and "cross-sectional width" of the fabricated object are defined as above, except that: (a) extruded object is replaced by fabricated object; (b) extrusion is replaced by fabrication; (c) deposition path is replaced by fabrication path; and (d) extrusion point is replaced by a point in the fabrication path where the fabrication for Point A occurred.

To "cure" means to harden.

"Defined Term" means a term or phrase that is set forth in quotation marks in this Definitions section.

"Deposition path" means a straight or curved segment of a toolpath, in which segment an extruder travels while depositing material.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

The term "extrude" means to force material through an orifice. Here are two non-limiting examples of "extrusion": (a) forcing a soft paste or other non-Newtonian fluid through a nozzle; and (b) ejecting ink from an inkjet printhead.

"Extruder" means an apparatus that extrudes material.

"Extruder speed" means speed of an extruder relative to a deposition platform that bears weight of material extruded by the extruder.

"Fabrication path" means a path that a tool travels along while performing fabrication, which path is a straight or curved segment of a toolpath.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"Fluid" means a gas or a liquid.

"For instance" means for example.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

A non-limiting example of input from a human user is data or instructions that the user inputs through an I/O device.

To say that an object is "integral" means that the object is a unitary structure, such that each point in the structure may be connected to each other point in the structure by a curved or straight line that is entirely within the structure. An object may be "integral", even if its material properties vary within the object.

"I/O device" means an input/output device. Non-limiting examples of an I/O device include any device for (a) receiving input from a human user, (b) providing output to a human user, or (c) both. Non-limiting examples of an I/O device also include a touch screen, other electronic display screen, keyboard, mouse, microphone, handheld electronic game controller, digital stylus, display screen, speaker, or projector for projecting a visual display.

"Motion system" means an actuator for actuating motion. A non-limiting example of a motion system is a robotic arm that actuates motion of a payload attached to the robotic arm.

"Non-deposition path" means a straight or curved segment of a toolpath, in which segment an extruder travels but does not deposit material.

"Non-fabrication path" means a path that a tool travels along without performing fabrication, which path is a straight or curved segment of a toolpath, and (ii) is a path.

"Nozzle" means an apparatus that has an orifice through which material is forced. As used herein: (a) the term "nozzle" does not imply any shape of the apparatus; and (b) the term "nozzle" has no implication regarding whether the nozzle is configured to accelerate material as it approaches or passes through the orifice.

"Nozzle speed" means speed of a nozzle relative to a deposition platform that bears weight of material extruded by the nozzle.

The term "or" is inclusive, not exclusive. For example A or B is true if A is true, or B is true, or both A or B are true. Also, for example, a calculation of A or B means a calculation of A, or a calculation of B, or a calculation of A and B.

As used herein, "parameter" means a variable. For example: (a) if $y=f(x)$, then both x and y are parameters; and (b) if $z=f(x(t), y(t))$, then t, x, y and z are parameters. A parameter may represent a physical quantity, such as pressure, temperature, or delay time.

A parenthesis is simply to make text easier to read, by indicating a grouping of words. A parenthesis does not mean that the parenthetical material is optional or may be ignored.

An example of "selecting" is specifying.

As used herein, the term "set" does not include a group with no elements. Mentioning a first set and a second set does not, in and of itself, create any implication regarding whether or not the first and second sets overlap (that is, intersect).

"Sliced layer-by-layer deposition" means deposition in which: (1) a user specifies a 3D virtual model of the object to be fabricated, and does not specify toolpaths; (2) one or more computers slice the 3D virtual model into virtual slices, (3) one or more computers run a program to determine a toolpath (such as rastering) for a tool depositing material to travel, and (4) one or more computers control deposition of material, such that material is physically deposited layer-by-layer and each physical layer corresponds to one of the virtual slices.

"Some" means one or more.

To "specify" a parameter means to specify a value of the parameter. For instance, specifying that height is 1 mm is an example of specifying the height and thus is an example of specifying a parameter. An example of "specifying" a given value of a given parameter is to select a menu item, where the menu item has the given value of the given parameter. To "specify" a thickness includes specifying a thickness without specifying where the thickness occurs. Likewise, to "specify" a parameter comprising height, width, cross-sectional height or cross-sectional width includes specifying the parameter without specifying where the parameter occurs. An example of "specifying" is selecting.

As used herein, a "subset" of a set consists of less than all of the elements of the set.

"Substantially" means at least ten percent. For example: (a) 112 is substantially larger than 100; and (b) 108 is not substantially larger than 100.

The term "such as" means for example.

The "tangent line" to a straight line means the straight line itself.

"Thickness" means vertical thickness or horizontal thickness. "Vertical thickness" means vertical distance from top to bottom of an object. "Horizontal thickness" means horizontal distance from side to side of an object. "Thickness" does not mean viscosity.

"3D" means three-dimensional.

A "3D curve" means a curve such that, in a 3D Cartesian coordinate system with coordinate axes denoted x, y and z, respectively: (i) an orthographic projection of a first region of the curve unto the xy plane is curved; (ii) an orthographic projection of a second region of the curve unto the yz plane is curved; and (iii) an orthographic projection of a third region of the curve unto the xz plane is curved, where the first, second or third regions may, but do not necessarily, overlap with each other in whole or in part.

To say that "a tool moves along a path" means that either: (a) the tool moves along the path; or (b) a fabrication site moves along the path. For purposes of the preceding sentence, a "fabrication site" is a position at which fabrication caused by tool occurs.

To say that a machine-readable medium is "transitory" means that the medium is a transitory signal, such as an electromagnetic wave.

"User-inputted tool instructions" mean instructions that: (a) are user-inputted; (b) specify a set of multiple fabrication paths to be traveled by a tool while the tool fabricates; and (c) for each respective path in the set of fabrication paths, specify one or more parameters of an object to be fabricated by the tool while the tool moves along the respective path. For purposes of the preceding sentence, to say that instructions are "user-inputted" means that a human user inputs data specifying a specific shape, specific length, specific position or other specific characteristic of at least one path in the set of fabrication paths while the user is consciously aware of the specific shape, specific length, specific position or other specific characteristic.

"User-inputted path instructions" mean instructions that: (a) are user-inputted; (b) specify a set of multiple deposition paths to be traveled by an extruder; and (c) for each respective path in the set of deposition paths, specify one or more parameters of an object to be extruded by the extruder while the extruder moves along the respective path. For purposes of the preceding sentence, to say that instructions are "user-inputted" means that a human user inputs data specifying a specific shape, specific length, specific position or other specific characteristic of at least one path in the set of deposition paths while the user is consciously aware of the specific shape, specific length, specific position or other specific characteristic.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) different steps, out of the steps in the method, occur a different number of times during the method, (4) any combination of steps in the method is done in parallel or serially; (5) any step or steps in the method is performed iteratively; (6) a given step in the method is applied to the same thing each time that the given step occurs or is applied to different things each time that the given step occurs; or (7) the method includes other steps, in addition to the steps described.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses. In each case described in this paragraph, the Applicant or Applicants are acting as his, her, its or their own lexicographer.

Variations

This invention may be implemented in many different ways. Here are some non-limiting examples:

This invention is not limited to extrusion. This invention may be implemented with any type of additive fabrication, including: (a) extrusion deposition (e.g., fused deposition modeling); (b) electron beam freeform fabrication; (c) fusing or agglomeration of granules (e.g., direct metal laser sintering, electron-beam melting, selective laser melting, selective heat sintering, selective laser sintering, plaster-based 3D printing, or powder and inkjet head 3D printing); (d) lamination (e.g., laminated object manufacturing); or (e) photopolymerization (e.g., stereolithography, or digital light processing). In some alternative implementations of this invention: (a) the extruder is replaced by an appropriate fabrication tool (e.g., a laser in selective laser sintering); (b) user-inputted path instructions are replaced by user-inputted tool instructions, as defined herein; and (c) deposition paths are replaced by fabrication paths, as defined herein. In some cases, the fabrication paths are the paths in which the site of fabrication moves. For example, consider selective laser sintering. Typically the site of fabrication (i.e., where sintering occurs) moves but the laser itself does not move; instead the laser beam is steered by other hardware.

In many implementations of this invention, a user specifies a deposition path. Alternatively, in some implementations of this invention: (a) a user specifies the position of an extruded object (e.g., by specifying points in a centerline of the object); (b) the position of the object implies a deposition path; and (c) a computer takes the position of the object as in input, and calculates the deposition path.

In illustrative implementations of this invention, the toolpath includes portions in which the extruder does extrude (deposition paths) and also include portions where the extruder does not extrude ("non-deposition paths"). In some cases, in each of the deposition paths, an extruder extrudes an object that is an integral (structurally unitary) object. For example, an integral object will result if the extrusion is temporally continuous—that is, material is being extruded at all points in time between the start and end of the extrusion. Also, for example, an integral object will result—even if the extrusion is not temporally continuous—if the extruder extrudes at all spatial points of the path traveled by the extruder between the start and the end of the extrusion. In this latter approach, an extruder may stop extruding at a spatial point on a deposition path, then linger at that spatial point without extruding material, then begin extruding again before moving away from that spatial point.

In one aspect, this invention is an apparatus comprising: (a) one or more I/O devices for accepting user-inputted path instructions that specify a set of multiple deposition paths for an extruder to travel; and (b) an actuator for actuating motion of the extruder along a trajectory that includes each of the deposition paths and also includes multiple non-deposition paths, such that the motion of the extruder along the trajectory includes the extruder moving along a deposition path, then along a non-deposition path, and then along another deposition path; wherein for each respective path in the set of deposition paths (i) the user-inputted path instructions specify a thickness of an object, and (ii) the extruder is configured to extrude the object such that (A) the extruder extrudes the object only while the extruder is moving along the respective path, and (B) the extruder extrudes the object in accordance with fabrication instructions computed by a computer based at least in part on the thickness. In some cases, the fabrication instructions specify (i) a pressure in the extruder or (ii) a parameter that is computed by a computer based at least in part on a pressure in the extruder. In some cases, the fabrication instructions specify (i) an extruder speed or (ii) a parameter that is computed by a computer based at least in part on an extruder speed. In some cases, the thickness is a vertical thickness. In some cases, the thickness is a horizontal thickness. In some cases, the extruder is configured such that: (a) material that exits a nozzle of the extruder comprises a stream of material; and (b) material properties of the stream vary at different spatial positions of the stream. In some cases, the extruder includes a nozzle that is configured to extrude a stream of material, such that the stream has an inner core that consists of a first type of material and has an outer sheath that consists of a second type of material, the first and second types of material being different from each other. In some cases, the extruder includes a set of one or more nozzles configured such that: (a) material that exits the set of one or more nozzles comprises a first stream and a second stream; and (b) the first stream has different material properties than the second stream. In some cases, the extruder is configured to extrude a set of multiple objects during the motion along the trajectory, one object per deposition path, such that: (a) each object, respectively, is an object described in clause (i) of the first sentence of this paragraph; and (b) after the set of objects is extruded, each object in the set of objects adheres to at least one other object in the set of objects such that the set of objects together comprises an integral 3D structure. In some cases, the apparatus is not configured to perform sliced layer-by-layer fabrication. Each of the cases described above in this paragraph is an example of the apparatus described in the first sentence of this paragraph, and is also an example of an embodiment of this invention that may be combined with other embodiments of this invention.

In another aspect, this invention is a method comprising: (a) one or more I/O devices accepting user-inputted path instructions that specify a set of multiple deposition paths for an extruder to travel; and (b) an actuator actuating motion of the extruder along a trajectory that includes each of the deposition paths and also includes multiple non-deposition paths, such that the motion of the extruder along the trajectory includes the extruder moving along a deposition path, then along a non-deposition path, and then along another deposition path; wherein for each respective path in the set of deposition paths (i) the user-inputted path instructions specify a height and a width of an object, and (ii) the extruder extrudes the object such that (A) the extruder extrudes the object only while the extruder is moving along the respective path, and (B) the extruder extrudes the object in accordance with instructions computed by a computer based at least in part on the height and width. In some cases, one or more of the deposition paths are 3D curves. In some cases: (a) a set of objects is extruded while the extruder moves along the set of deposition paths, one object per deposition path; and (b) each object in the set of objects adheres to at least one other object in the set of objects, such that the set of objects together comprise an integral 3D structure. In some cases: (a) the deposition paths include a path that is a 3D curve; (b) the 3D curve includes a first point and a second point, the second point being higher than the first point; and (c) as the extruder travels along the 3D curve, the extruder extrudes material at both the first and second points, even though the extruder has not completed extrusion at all build points of the integral 3D structure that lie in a horizontal plane that intersects the first point. In some cases, the structure has material properties that vary as a function of spatial position within the structure. In some cases, one or more I/O devices accept input from a user, which input specifies one or more material properties of one or more materials to be extruded during a path in the set of deposition paths. In some cases, the input specifies a concentration for a mixture. In some cases, one or more I/O devices accept input from a user, which input specifies at least one parameter out of a set of parameters that consists of (i) a type of nozzle of the extruder, (ii) nozzle speed, or (iii) a temperature. In some cases, the method does not include steps that collectively comprise sliced layer-by-layer deposition. Each of the cases described above in this paragraph is an example of the method described in the first sentence of this paragraph, and is also an example of an embodiment of this invention that may be combined with other embodiments of this invention.

In another aspect, this invention is a system comprising: (a) one or more I/O devices for accepting user-inputted tool instructions that specify a set of multiple fabrication paths for a tool to travel; and (b) an actuator for actuating motion of the tool along a trajectory that includes each of the fabrication paths and also includes multiple non-fabrication paths, such that the motion of the tool along the trajectory includes the tool moving along a fabrication path, then along a non-fabrication path, and then along another fabrication path; wherein for each respective path in the set of fabrication paths (i) the user-inputted tool instructions specify a thickness of an object, and (ii) the tool is configured to fabricate the object by additive fabrication such that (A) the tool fabricates the object only while the tool is moving along the respective path, and (B) the tool fabricates the object in accordance with instructions computed by a computer based at least in part on the thickness. The preceding sentence describes an example of an embodiment of this invention that may be combined with other embodiments of this invention.

The above description (including without limitation any attached drawings and figures) describes illustrative implementations of the invention. However, the invention may be implemented in other ways. The methods and apparatus which are described above are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the abovementioned implementations, embodiments and features.

What is claimed is:

1. An apparatus comprising:
    (a) one or more I/O devices configured to accept user-inputted path instructions that specify a set of multiple deposition paths for an extruder to travel; and
    (b) an actuator configured to actuate physical motion of the extruder along a trajectory that includes each of the deposition paths and also includes multiple non-deposition paths, in such a way that the physical motion of the extruder along the trajectory includes the extruder moving along a deposition path, then along a non-deposition path, and then along another deposition path;
    wherein for each respective path in the set of deposition paths
        (i) the user-inputted path instructions specify a thickness of an object, and
        (ii) the extruder is configured to extrude the object in such a way that (A) the extruder extrudes the object only while the extruder is moving along the respective path, and (B) the extruder extrudes the object in accordance with fabrication instructions computed by a computer based at least in part on the thickness.

2. The apparatus of claim 1, wherein the fabrication instructions specify (i) a pressure in the extruder or (ii) a parameter that is computed by a computer based at least in part on a pressure in the extruder.

3. The apparatus of claim 1, wherein the fabrication instructions specify (i) an extruder speed or (ii) a parameter that is computed by a computer based at least in part on an extruder speed.

4. The apparatus of claim 1, wherein the thickness is a vertical thickness.

5. The apparatus of claim 1, wherein the thickness is a horizontal thickness.

6. The apparatus of claim 1, wherein the extruder is configured in such a way that:
    (a) material that exits a nozzle of the extruder comprises a stream of material; and
    (b) material properties of the stream vary at different spatial positions of the stream.

7. The apparatus of claim 1, wherein the extruder includes a nozzle that is configured to extrude a stream of material in such a way that the stream has an inner core that consists of a first type of material and has an outer sheath that consists of a second type of material, the first and second types of material being different from each other.

8. The apparatus of claim 1, wherein the extruder includes a set of one or more nozzles configured in such a way that:
    (a) material that exits the set of one or more nozzles comprises a first stream and a second stream; and
    (b) the first stream has different material properties than the second stream.

9. The apparatus of claim 1, wherein the extruder is configured to extrude a set of multiple objects during the motion along the trajectory, one object per deposition path, in such a way that:
    (a) each object, respectively, is an object described in clause (i) of claim 1; and
    (b) after the set of objects is extruded, each object in the set of objects adheres to at least one other object in the set of objects in such a way that the set of objects together comprises an integral 3D structure.

10. The apparatus of claim 1, wherein the apparatus is not configured to perform sliced layer-by-layer fabrication.

* * * * *